(12) United States Patent
Baba

(10) Patent No.: US 9,158,095 B2
(45) Date of Patent: Oct. 13, 2015

(54) OPTICAL UNIT AND IMAGING APPARATUS

(75) Inventor: Tomohiko Baba, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 221 days.

(21) Appl. No.: 13/583,863

(22) PCT Filed: Mar. 14, 2011

(86) PCT No.: PCT/JP2011/055922
§ 371 (c)(1),
(2), (4) Date: Sep. 10, 2012

(87) PCT Pub. No.: WO2011/118434
PCT Pub. Date: Sep. 29, 2011

(65) Prior Publication Data
US 2013/0010181 A1    Jan. 10, 2013

(30) Foreign Application Priority Data
Mar. 24, 2010    (JP) ................. 2010-067968

(51) Int. Cl.
G02B 9/12    (2006.01)
G02B 13/00   (2006.01)
G02B 13/18   (2006.01)
(52) U.S. Cl.
CPC ............... *G02B 13/006* (2013.01); *G02B 9/12* (2013.01); *G02B 13/0035* (2013.01); *G02B 13/18* (2013.01)

(58) Field of Classification Search
CPC .............. G02B 9/12; G02B 9/14; G02B 9/18; G02B 9/24; G02B 9/26; G02B 9/28; G02B 9/30; G02B 9/32
USPC .......................................... 359/784–792, 716
See application file for complete search history.

(56) References Cited

U.S. PATENT DOCUMENTS

| 7,453,654 B2 | 11/2008 | Shinohara |
| 2006/0044450 A1 | 3/2006 | Wolterink et al. |
| 2010/0321794 A1* | 12/2010 | Hirao et al. ................. 359/716 |

FOREIGN PATENT DOCUMENTS

| JP | 2007-219079 | 8/2007 |
| JP | 2008-134411 | 6/2008 |
| JP | 2009-251367 | 10/2009 |
| WO | 2008-102773 | 8/2008 |
| WO | 2008-102774 | 8/2008 |
| WO | 2008102648 | 8/2008 |
| WO | 2008-139657 | 11/2008 |
| WO | 2009004965 | 1/2009 |

* cited by examiner

Primary Examiner — Darryl J Collins
(74) Attorney, Agent, or Firm — Dentons US LLP

(57) ABSTRACT

An optical unit and an imaging apparatus including the optical unit. The optical unit includes a first lens group, a second lens group, and a third lens group, which are arranged in order from an object side to an image plane side. Further, the first lens group includes a first lens element, a first transparent body, and a second lens element, which are arranged in order from the object side to the image plane side.

15 Claims, 11 Drawing Sheets

EXAMPLE OF DEFOCUS CHARACTERISTICS
1/4 SIZE : Fno#2.9 : f 3.69mm TT 4.4mm

EXAMPLE OF DEFOCUS CHARACTERISTICS
1/4 SIZE : Fno#2.9 : f 3.74mm TT 4.4mm

WITH REGARD TO THIRD GROUP, MOLDED LENSES OR
INDIVIDUALLY CHANGED LENSES MANUFACTURED IN
CASTING METHOD ARE ASSEMBLED INDIVIDUALLY.

OPTICAL UNIT AND IMAGING APPARATUS

TECHNICAL FIELD

The present invention relates to an optical unit and an imaging apparatus, which are applied to imaging equipment.

BACKGROUND ART

High resolution, low cost, and downsizing are strongly demanded for imaging equipment mounted on recent years' mobile phone, personal computer (PC), and the like.

The cell pitch of an imaging element such as a CCD (Charge Coupled Device) or CMOS (Complementary Metal Oxide Semiconductor) image sensor has dramatically become narrow, and high image forming performance that suppresses optical aberrations, especially axial chromatic aberration more than a normal optical system, is required for an optical system.

Moreover, known is a technology for forming a lens in a wafer form to reduce costs for cost requirements.

A technology disclosed in Patent Document 1 is known as a representative example of them.

What is disclosed herein is called a hybrid (HYBRID) method.

In the hybrid method, multiple camera modules are simultaneously fabricated by forming multiple lenses on a wafer-shaped glass plate, and an imaging element wafer and the lens elements are adhered in a wafer form and are subsequently diced.

Moreover, for example, a technology disclosed in Patent Document 2 is known as a general imaging lens used for imaging equipment mounted on a mobile phone, a PC, or the like.

CITATION LIST

Patent Documents

Patent Document 1: US2006/0044450A1
Patent Document 2: Japanese Patent Application Laid-Open No. 2008-134411
Patent Document 3: Japanese Patent Application Laid-Open No. 2007-1219079

SUMMARY OF THE INVENTION

Problems to be Solved by the Invention

The advantages of the hybrid method are that an IR cut filter and a diaphragm can be formed on a glass wafer; accordingly, unlike before, these separate parts are unnecessary, and multiple finished products can be simultaneously made; accordingly, the number of assembly man-hours per product is small, and it is possible to reduce costs.

In the former case, there is also an advantage that a separate IR cut filter is unnecessary and accordingly the back focus of a lens can be short. Therefore, optical design having a high degree of freedom is possible.

With regard to CIF, VGA, and the like, the imaging area is small, and accordingly variations in the focal points of multiple lens elements formed in a wafer form do not become a big issue. Therefore, it is advantageous.

However, the disadvantage of the hybrid method is that the imaging area expands with increases in resolution to as high as 3M pixels or more, and accordingly variations in the focal points of the lens elements become large. As a result, if an imaging element and a lens element are adhered in a wafer form, the failure of defocus occurs frequently, and accordingly it becomes impossible to achieve the original purpose of manufacturing at low cost.

The advantage of the lens disclosed in Patent Document 2 is that high image forming performance is obtained by having a three-element configuration and using an aspheric surface heavily, and it is easy to adjust focus by placement in a screw barrel or the like since the lens projection shape is a circle.

However, there is a drawback that this lens needs an IR cut filter as a separate part and the number of parts is large since a diaphragm and the like are separate parts.

It is known that chromatic aberration is large and there is a limit to performance. Furthermore, small lens elements of a three-group configuration including the case here has a second lens that is largely bent, which results in drawbacks such as that it is not possible to evaporate AR coating accurately, and it is easy to become a factor of ghosting.

Moreover, including this case, a third lens deviates greatly from the spherical shape, and accordingly a limit to aberration correction is caused, and it is difficult to increase the brightness to less than Fno 2.4.

Moreover, for example, a technology disclosed in Patent Document 3 is known as a representative example of a four-group configuration.

The configuration is currently very widely adopted in a camera module having auto focus (AF); however, its depth of field is shallow and it is not suitable for a fixed-focus (FF) optical unit.

FIG. 1 is a view illustrating typical MTF characteristics of when a lens unit for ¼ size is designed with the current three-group/three-element lens.

FIG. 2 is a view illustrating typical MTF characteristics of when a lens unit for ¼ size is designed with the current four-group/four-element lens.

As shown here, the former has a low MTF at a peak. However, the focusing characteristics are very gentle, and the focus range where MTF becomes 0 is as wide as 100 μm.

On the other hand, the latter has a high MTF at a peak. However, the focusing characteristics are very steep, and the focus range where MTF becomes 0 is only 50 μm.

The former is optimal to an FF module, and the latter is optimal to an AF module.

The problem of the current optical system is that if three groups are changed to four groups to increase optical characteristics, the depth of field becomes shallow and therefore it becomes unsuitable for FF. Therefore, at the moment, there does not exist an optics solution optimal to an FF whose MTF is high, which is bright and whose depth of field is deep.

The present invention is to provide an optical unit and an imaging apparatus, which can realize a lens element that has a high MTF, is small, bright, and optimal to a fixed-focus camera while having an advantage of the three-group configuration that the depth of field is deep.

Solutions to Problems

An optical unit according to a first aspect of the present invention includes, arranged in order from an object side to an image plane side: a first lens group; a second lens group; and a third lens group, wherein the first lens group includes, arranged in order from the object side to the image plane side, a first lens element, a first transparent body, and a second lens element.

Preferably, the first lens element and the second lens element form a doublet lens.

An imaging apparatus according to a second aspect of the present invention includes: an imaging element; and an optical unit for forming an image of a subject in the imaging element, wherein the optical unit includes, arranged in order from an object side to an image plane side, a first lens group, a second lens group, and a third lens group, and the first lens group includes, arranged in order from an object side to an image plane side, a first lens element, a first transparent body, and a second lens element.

An imaging apparatus according to a third aspect of the present invention includes: an imaging element; and an optical unit for forming an image of a subject in the imaging element, wherein the optical unit includes, arranged in order from an object side to an image plane side, a first lens group, a second lens group, and a third lens group, the first lens group includes, arranged in order from an object side to an image plane side, a first lens element, a transparent body, and a second lens element, and the first lens element and the second lens element form a doublet lens.

Effects of the Invention

According to the present invention, it is possible to realize a lens element that has a high MTF, is small, bright, and optimal to a fixed-focus camera while having an advantage of the three-group configuration that the depth of field is deep.

MODE FOR CARRYING OUT THE INVENTION

A description will hereinafter be given of embodiments of the present invention while associating them with accompanying drawings.

A description will be given in the following order:
1. First Embodiment (a first configuration example of an imaging lens adopting an optical unit),
2. Second Embodiment (a second configuration example of an imaging lens adopting an optical unit),
3. Third Embodiment (a third configuration example of an imaging lens adopting an optical unit),
4. Fourth Embodiment (a fourth configuration example of an imaging lens adopting an optical unit),
5. Fifth Embodiment (a fifth configuration example of an imaging lens adopting an optical unit),
6. Sixth Embodiment (a concept of wafer optics),
7. Seventh Embodiment (a configuration example of an imaging apparatus).

<1. First Embodiment>

Figure 3:
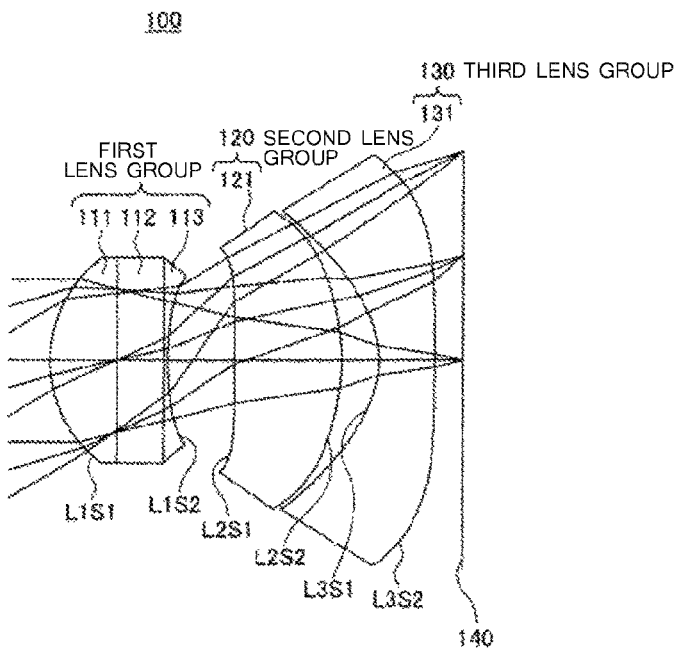
FIG. 3 is a view illustrating a configuration example of an imaging lens according to a first embodiment of the present invention.

FIG. 3 is a view illustrating a configuration example of an imaging lens that adopts an optical unit according to a first embodiment of the present invention.

An imaging lens 100 according to the first embodiment includes a first lens group 110, a second lens group 120, a third lens group 130 and an image plane 140, which are arranged in order from an object side OBJS to the image plane side, as shown in FIG. 3.

The imaging lens 100 is formed as a single focus lens. The first lens group 110, the second lens group 120 and the third lens group 130 form an optical unit.

In the first embodiment, the first lens group 110 is formed by a conjugate including a plurality of lens elements arranged with a transparent body interposed therebetween.

The second lens group 120 is formed only of one third lens element.

The third lens group 130 is formed only of one fourth lens element.

Specifically, the first lens group 110 has replica lenses formed on and under a glass substrate.

The first lens group 110 is formed of a conjugate including a first lens element 111, a first transparent body 112, and a second lens element 113, which are arranged in order from the object side OBJS to the image plane 130 side.

Here, the first lens element 111 has a plano-convex shape and a large Abbe number, a glass plate equivalent to BK7 manufactured by Schott is used for the transparent body (glass substrate) 112 for low cost manufacturing, and a plano-concave lens is formed for the second lens element 113.

In the first embodiment, for example, the Abbe number of the first lens element 111 is set to 57.3, and the Abbe number of the second lens element 113 is set to 30.

Moreover, a diaphragm is realized by previously attaching a material having little transmission such as a chrome film to the object side of the glass substrate.

Similarly, an IR cut filter is also previously attached by vapor deposition onto the glass substrate.

From these, the chromatic aberration is corrected in the first lens group 110, and it is also possible to have a structure that can easily remove the entire aberration.

The first lens group 110 as a whole has a strong positive power and greatly contributes to shortening of an optical length.

The second lens group 120 is formed only of a third lens element 121.

Specifically, the second lens group 120 has characteristics of being formed by glass molding with, for example, an Abbe number of 31 and not being bent largely and therefore having a positive power.

This is because especially the first lens group 110 and the third lens group 130 greatly contribute to aberration correction, and accordingly it becomes unnecessary to bend the second lens group 120.

Without large bending, it is possible to accurately perform AR coating, and ghosting and flare are unlikely to occur.

It is possible to use not only a plastic molded lens but also a glass molded lens and a high heat resistant lens of injection molding.

The third lens group 130 is formed only of a fourth lens element 141.

Specifically, the third lens group 130 is constructed of a plastic molded lens made out of polycarbonate or a heat resistant resin, has a large negative power and a large incident surface, and is bent largely to the object side.

The center of curvature comes close to the diaphragm and therefore the astigmatism aberration and the coma aberration are corrected excellently.

Moreover, since the shape does not deviate greatly from the spherical shape, it is possible to realize a bright lens that has few changes in astigmatism aberration with respect to an incident NA due to an image height.

Moreover, an outgoing side surface has a shape that is also bent substantially to the object side, and orients a convex shape to the image side, which is a structure where ghosting is unlikely to occur.

Moreover, the incidence angle of light on an imager is suppressed low up until the perimeter and desirable performance can be obtained as the characteristics of a camera.

From these, a bright lens whose total optical length is short is realized.

In this manner, the first lens group 110 is formed of a conjugate of lens elements and a transparent body, and the second lens group 120 and the third lens group 130 are formed only of lens elements.

Therefore, the imaging lens 100 as a whole has lens surfaces including a first surface L1S1, a second surface L1S2, a third surface L2S1, a fourth surface L2S2, a fifth surface L3S1, and a sixth surface L3S2.

The first surface L1S1 is formed of an object side surface of the first lens element 111, and the second surface L1S2 is formed of an image plane side surface of the second lens element 113.

The third surface L2S1 is formed of an object side surface of the third lens element 121, and the fourth surface L2S2 is formed of an image plane side surface of the third lens element 121.

The fifth surface L3S1 is formed of an object side surface of the fourth lens element 141, and the sixth surface L3S2 is formed of an image plane side surface of the fourth lens element 121.

It is assumed that in the imaging lens 100 being a single focus lens, an imaging plane (image receiving surface) of a solid-state imaging device such as a CCD sensor or a CMOS sensor is arranged on the image plane 140.

An unillustrated cover glass is arranged between the sixth surface L3S2 and the image plane 140. An optical member, in addition to a cover glass formed out of resin or glass, an infrared cut filter, a low-pass filter, and the like, may be arranged between the fourth surface SF4 and the image plane 130.

Figure 1:
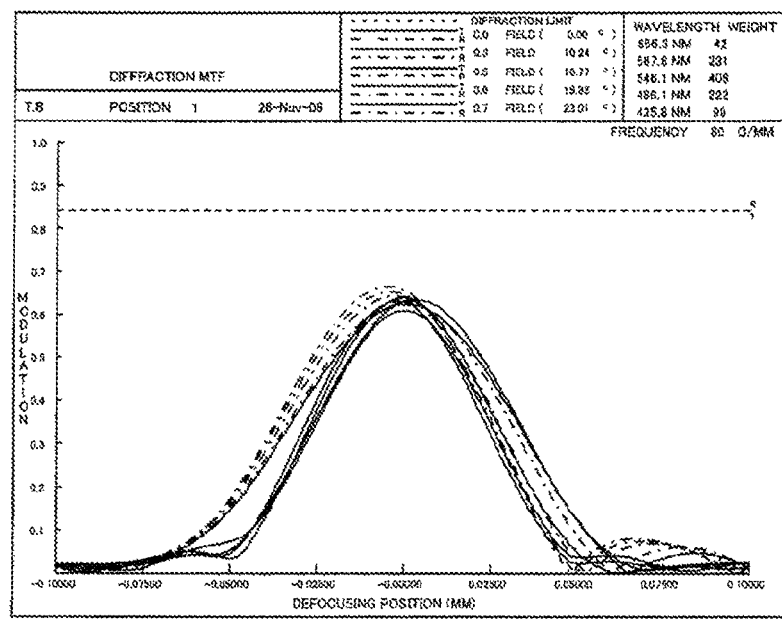
FIG. 1 is a view illustrating typical MTF characteristics of when a lens unit for ¼ size is designed with a current three-group/three-element lens.

In the embodiment, in FIG. 1, the left side is the object side (front) and the right side is the image plane side (rear).

The light flux entered from the object side forms an image on the image plane 140.

A description will hereinafter be given of the configuration of an imaging lens of the embodiment and the operation thereof.

In the following description, the transparent body 112 may be expressed as a glass substrate, using the same reference sign.

The imaging lens 100 being a single focus lens in the embodiment is constructed to satisfy the following conditional expressions (1) to (11).

Conditional expression (1) is a relational expression related to the bending of the second lens group 120.

[Math. 1]

$$-10 \leq qL2 \leq -0.4$$

$$qL2 = (RL2S2 + RL2S1)/(RL2S2 - RL2S1) \quad (1)$$

where RL2S1 represents the radius of curvature of an input side surface S1 of the second lens group 120, and RL2S2 represents the radius of curvature of an outgoing side surface S2 of the second lens group 120.

In conditional expression (1), if the lower limit is exceeded, the negative power becomes weak, and the capability of aberration correction decreases, which is not suitable for a bright, small lens. Moreover, if the upper limit is exceeded, the lens becomes close to a biconvex lens, and an incidence angle of light becomes very large around the periphery of an incident surface of the second lens group 120 to cause extra astigmatism aberration and coma aberration, and the characteristics on the periphery of a screen deteriorates and therefore the merchantability is lost.

Conditional expression (2) is a relational expression related to an incident surface of the third lens group 130 (the paraxial quantity of the third lens group). In the embodiment, the third lens group 130 has characteristics of having a negative power, and having the radius of curvature of the incident surface in the vicinity of the diaphragm, which leads to high optical characteristics.

[Math. 2]

$$-3 \leq RL3S1/f \leq -0.2 \quad (2)$$

where RL3S1 represents the radius of curvature of an incident side surface S1 of the third lens group 130, and f represents the focal length of the lens system.

In conditional expression (2), if the lower limit is exceeded, the radius of curvature does not come close to the diaphragm, and the capability of aberration correction decreases, which is not suitable for a bright, small lens. If the upper limit is exceeded, the curvature becomes too strong, and conversely aberration is corrected too much, which causes opposite aberration to deteriorate the optical characteristics.

Conditional expression (3) relates to a focal length fg1 of the first lens group 110.
[Math. 3]

$$0.5 \le fg1/f \le 1.5 \tag{3}$$

In conditional expression (3), if the lower limit is exceeded, the positive power of the first group becomes too strong and the manufacturing tolerance decreases and therefore it is not suitable for the applications of the present invention that aims for an inexpensive module. If the upper limit is exceeded, the positive power becomes weak and the lens becomes close to a retrofocus optical system. Then, the optical length extends, which is not suitable for the applications of the present invention having the object of a small module.

Conditional expression (4) relates to a focal length fg2 of the second lens group 120.
[Math. 4]

$$0.5 \le fg2/f \le 50 \tag{4}$$

In conditional expression (4), if the lower limit is exceeded, the positive power becomes too strong and the manufacturing tolerance decreases, which is not suitable for the applications of the present invention that aims for an inexpensive module. If the upper limit is exceeded, the power becomes weak and the capability of aberration correction decreases, which is not suitable for a bright, small lens.

Conditional expression (5) relates to a focal length fg3 of the third lens 130 group.
[Math. 5]

$$-5 \le fg3/f \le -0.3 \tag{5}$$

In conditional expression (5), if the lower limit is exceeded, the power becomes weak and the capability of aberration correction decreases, which is not suitable for a bright, small lens. If the upper limit is exceeded, the power becomes too strong, and conversely aberration is corrected too much, which causes opposite aberration to deteriorate the optical characteristics.

Conditional expression (6) relates to the angle of view.
[Math. 6]

$$20 \le \omega \le 40 \tag{6}$$

where ω represents a half angle of view.

In conditional expression (6), if the lower limit is exceeded, the angle of view becomes too narrow and the lens becomes similar to a telephoto lens, which is not suitable for a cellular application and a camera for a personal computer (PC), which often image the vicinity. If the upper limit is exceeded, the lens becomes a high-angle lens too much, and is not suitable for a cellular application and a PC camera that often takes a self-portrait.

Conditional expression (7) relates to an Abbe number vE1 of the first lens element 111.
[Math. 7]

$$45 \le vE1 \le 90 \tag{7}$$

In conditional expression (7), if the lower limit is exceeded, the chromatic aberration becomes large, which is not suitable for high resolution. If the upper limit is exceeded, lens glass material becomes unpractical.

Conditional expression (8) relates to an Abbe number vE2 of the second lens element 113.
[Math. 8]

$$20 \le vE2 \le 60 \tag{8}$$

In conditional expression (8), if the lower limit is exceeded, lens glass material becomes unpractical. If the upper limit is exceeded, the chromatic aberration becomes large, which is not suitable for high resolution.

Conditional expression (9) relates to an F-number Fno.
[Math. 9]

$$1.0 \le Fno \le 3.0 \tag{9}$$

In conditional expression (9), if the lower limit is exceeded, vignetting occurs in the imager when light enters the imager, which causes problems such as color mixture and the performance of a camera deteriorates. If the upper limit is exceeded, the lens becomes dark, and it is contrary to the object of the embodiment of the present invention.

Conditional expression (10) relates to an optical length TT of the lens system.
[Math. 10]

$$0.8 \le TT/f \le 1.5 \tag{10}$$

In conditional expression (10), if the lower limit is exceeded, the lens becomes very compact and desirable; however, the shape of the lens becomes difficult to manufacture, which is not desirable. If the upper limit is exceeded, the module itself upsizes and it is contrary to the object of the embodiment of the present invention.

Conditional expression (11) relates to back focus BF of the lens system.
[Math. 11]

$$0.01 \le BF \le 0.6 \tag{11}$$

In conditional expression (11), if the lower limit is exceeded, it becomes impossible to make adjustments when manufacturing, which is a problem. Exceeding the upper limit brings a constraint to lens design, which makes no sense.

However, this does not apply if some part is inserted between the lens system and the imaging element.

The above conditional expressions (1) to (11) are common to Examples 1 to 5 that will be handled below, and their appropriate adoption as necessary realizes more preferable imaging performance and a compact optical system, which are suitable for individual imaging elements or imaging apparatuses.

When a direction from the object side to the image plane side is positive, k is a conic coefficient, A, B, C and D are aspheric coefficients, and r is the radius of the center of curvature, the shape of the aspheric surface of a lens is expressed in the following expression. y represents the height of light from the optical axis, and c represents the inverse (1/r) of the radius of the center of curvature r, respectively.

However, X represents the distance from a tangent plane with respect to the vertex of an aspheric surface, A a fourth order aspheric coefficient, B a sixth order aspheric coefficient, C an eighth order aspheric coefficient, D a tenth order aspheric coefficient, respectively.

Aspheric Surface Equation $$X = \frac{cy^2}{1 + \sqrt{1 - (1+k)c^2 y^2}} + Ay^4 + By^6 + Cy^8 + Dy^{10} \qquad \text{[Math. 1]}$$

Figure 4:
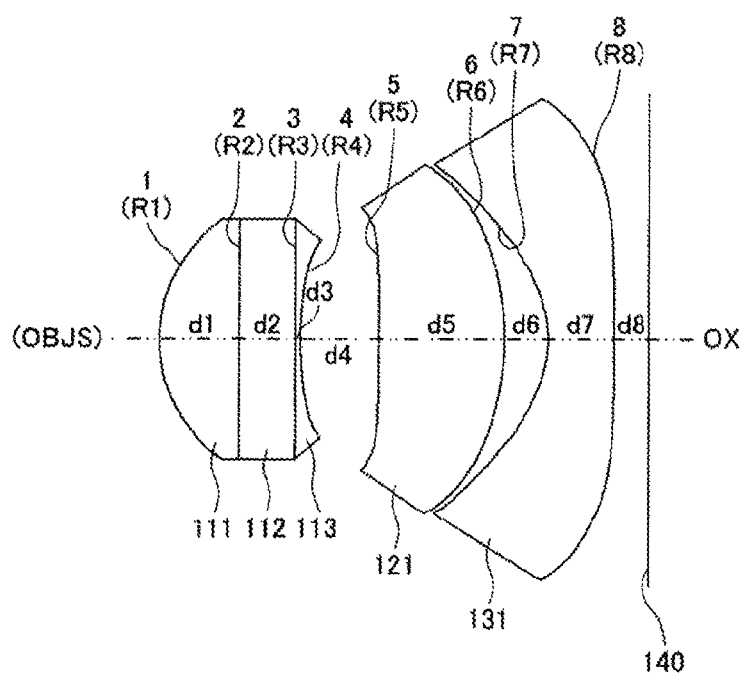
FIG. 4 is a view illustrating surface numbers assigned to lenses constituting lens groups, a substrate, and a cover glass constituting an imaging unit of the imaging lens according to the first embodiment.

FIG. 4 is a view illustrating surface numbers assigned to lenses constituting lens groups, a substrate, and a cover glass constituting an imaging unit of the imaging lens according to the first embodiment.

Specifically, a surface number of number one is assigned to an object side surface (convex surface) of the first lens element 111, and a surface number of number two to a boundary surface (joint surface) between an image plane side surface of the first lens element 111 and an object side surface of the transparent body.

A surface number of number three is assigned to a boundary surface (joint surface) between an image plane side surface of the transparent body 112 and an object side surface of the second lens element 113.

A surface number of number four is assigned to an image plane side surface of the second lens element 113.

A surface number of number five is assigned to an object side surface of the third lens element 121, and a surface number of number six to an image plane side surface of the third lens element 121.

A surface number of number seven is assigned to an object side surface of the fourth lens element 131, and a surface number of number eight to an image plane side surface of the fourth lens element 131.

Moreover, as shown in FIG. 4, in the imaging lens 100 of the embodiment, the radius of the center of curvature of the object side surface (number one) 1 of the first lens element 111 is set as R1.

The radius of the center of curvature of the boundary surface (joint surface) 2 between the image plane side surface of the first lens element 111 and the object side surface of the transparent body 112 is set as R2.

The radius of the center of curvature of the boundary surface (joint surface) 3 between the image plane side surface of the transparent body 112 and the object side surface of the second lens element 113 is set as R3.

The radius of the center of curvature of the image plane side surface 4 of the second lens element 113 is set as R4.

The radius of the center of curvature of the object side surface 5 of the third lens element 121 is set as R5, and the radius of the center of curvature of the image plane side surface 6 of the third lens element 121 as R6.

The radius of the center of curvature of the object side surface 7 of the fourth lens element 131 is set as R7, and the radius of the center of curvature of the image plane side surface 8 of the fourth lens element 131 as R8.

The radii of the center of curvature R2 and R3 of the surfaces 2 and 3 are infinite (INFINITY).

Moreover, as shown in FIG. 4, the distance on an optical axis OX between the surfaces 1 and 2, the distance being the thickness of the first lens element 111, is set as d1, and the distance on the optical axis OX between the surfaces 2 and 3, the distance being the thickness of the transparent body 112, is set as d2.

The distance on the optical axis OX between the surfaces 3 and 4, the distance being the thickness of the second lens element 113, is set as d3, and the distance on the optical axis OX between the image plane side surface 4 of the second lens element 113 and the object side surface 5 of the third lens element 121 is set as d4.

The distance on the optical axis OX between the surfaces 5 and 6, the distance being the thickness of the third lens element 121, is set as d5, and the distance on the optical axis OX between the image plane side surface 6 of the third lens element 121 and the image plane side surface 7 of the fourth lens element 131 is set as d6.

The distance on the optical axis OX between the surfaces 7 and 8, the distance being the thickness of the fourth lens element 131, is set as d7, and the distance between the image plane side surface 8 of the fourth lens element 131 and the image plane 140 is set as d8.

Example 1 will be shown below with specific numerical values of the imaging lens. In Example 1, the surface numbers shown in FIG. 4 are assigned to the lens elements glass substrate (transparent body) and the imaging plane 130 constituting an imaging unit of the imaging lens 100.

EXAMPLE 1

Tables 1, 2, 3 and 4 show numerical values of Example 1. The numerical values of Example 1 correspond to the imaging lens 100 of FIG. 1.

Example 1 is a design example for a 5-megapixel (Mage pixel) CMOS imager of ¼ size and 1.4 μm pitch.

Table 1 shows the radii of curvature (R: mm), distances (d: mm), refractive indices (nd), and variances (vd) of the lens elements, the glass substrate (transparent body), and the like, which correspond to the surface numbers of the imaging lens in Example 1.

TABLE 1

| Example 1 Lens Configuration Data | | | | |
|---|---|---|---|---|
| Surface Number | R | d | nd | vd |
| 1: | 1.385 | 0.700 | 1.51 | 57.3 |
| 2: | INFINITY | 0.500 | 1.52 | 55.0 |
| 3: | INFINITY | 0.050 | 1.60 | 30.0 |
| 4: | 4.145 | 0.698 | | |
| 5: | 47.391 | 1.136 | 1.69 | 31.3 |
| 6: | −2.459 | 0.387 | | |
| 7: | −1.121 | 0.600 | 1.59 | 30.0 |
| 8: | −18.762 | 0.300 | | |

Table 2 shows the fourth, sixth, eighth and tenth order aspheric coefficients of the surface 1 of the first lens element 111 that includes an aspheric surface in Example 1, the surface 4 of the second lens element 113, the surface 5 of the third lens element 121, and the surface 6 of the third lens element 121.

Furthermore, shown are the fourth, sixth, eighth and tenth order aspheric coefficients of the surface 7 of the fourth lens element 131, and the surface 6 of the fourth lens element 131.

In Table 2, K represents a conic constant, A a fourth order aspheric coefficient, B a sixth order aspheric coefficient, C an eighth order aspheric coefficient, and D a tenth order aspheric coefficient, respectively.

TABLE 2

| Example 1 Aspheric Data | | | | | |
|---|---|---|---|---|---|
| First Surface: | K: 0.299 | A: −0.186E−01 | B: −0.414E−02 | C: −0.327E−02 | D: −0.695E−02 |
| Fourth Surface: | K: 4.400 | A: 0.485E−01 | B: 0.543E−01 | C: −0.724E−01 | D: 0.125E+00 |

TABLE 2-continued

Example 1 Aspheric Data

| | | | | | |
|---|---|---|---|---|---|
| Fifth Surface: | K: 10.000 | A: 0.154E−01 | B: −0.179E−01 | C: 0.541E−02 | D: −0.177E−02 |
| Sixth surface: | K: −0.369 | A: 0.154E−01 | B: −0.179E−01 | C: 0.541E−02 | D: −0.177E−02 |
| Seventh Surface: | K: −1.043 | A: 0.677E−01 | B: −0.718E−01 | C: 0.385E−01 | D: −0.726E−02 |
| Eighth Surface: | K: 10.000 | A: 0.140E−01 | B: −0.228E−01 | C: 0.591E−02 | D: −0.567E−03 |

Table 3 specifically shows the focal length f, numerical aperture F, half angle of view ω, and lens length H of the imaging lens 100 in Example 1.

Here, the focal length f is set to 3.64 [mm], the numerical aperture F to 2.1, the half angle of view ω to 31.5 deg, and the lens length H to 4.37 [mm].

TABLE 3

Example 1 Configuration Data f (Focal Length) = 3.64 mm
F (Numerical Aperture) = 2.1
ω (Half Angle of View) = 31.5 deg
H (Total Lens Length) = 4.37 mm Table 4 shows that the above conditional expressions (1) to (11) are satisfied in Example 1.

TABLE 4

Values of Conditional Expressions by Example

| Conditional Expression | Example 1 |
|---|---|
| (1) | −0.90 |
| (2) | −0.31 |
| (3) | 1.02 |
| (4) | 0.93 |
| (5) | −0.56 |
| (6) | 31.5 |
| (7) | 57.3 |
| (8) | 30 |
| (9) | 2.1 |
| (10) | 1.20 |
| (11) | 0.3 |

As shown in Table 4, in Example 1, a bending factor qL2 of the second lens group 120 is set to −0.9, and the condition defined in conditional expression (1) is satisfied.

The incident surface of the third lens 130 group (the paraxial quantity of the third lens group) RL3S1/f is set to −0.31, and the condition defined in conditional expression (2) is satisfied.

The focal length fg1 of the first lens group 110 is set to 1.02, and the condition defined in conditional expression (3) is satisfied.

The combined focal length fg2 of the second lens group 120 is set to 0.93, and the condition defined in conditional expression (4) is satisfied.

The combined focal length fg3 of the fourth lens group 130 is set to −0.56, and the condition defined in conditional expression (5) is satisfied.

The half angle of view ω is set to 31.5, and the condition defined in conditional expression (6) is satisfied.

The Abbe number vE1 of the first lens element 111 is set to 57.3, and the condition defined in conditional expression (7) is satisfied.

The Abbe number vE2 of the second lens element 113 is set to 30, and the condition defined in conditional expression (8) is satisfied.

The F-number Fno of the lens system is set to 2.1, and the condition defined in conditional expression (9) is satisfied.

The optical length TT of the lens system is set to 1.20, and the condition defined in conditional expression (10) is satisfied.

The back focus length FB of the lens system is set to 0.3, and the condition defined in conditional expression (11) is satisfied.

Figure 5:
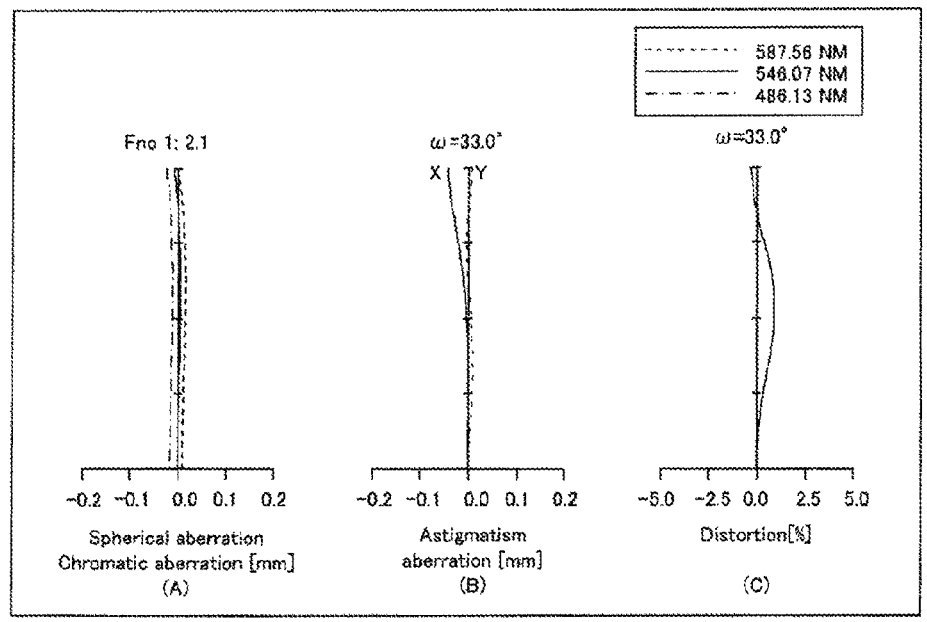
FIG. 5 is an aberration diagram illustrating spherical aberration, astigmatism aberration, and distortion in Example 1.

FIG. 5 is an aberration diagram illustrating spherical aberration (chromatic aberration), astigmatism aberration, and distortion in Example 1. (A) in FIG. 5 represents the spherical aberration (chromatic aberration), (B) in FIG. 5 the astigmatism aberration, and (C) in FIG. 5 the distortion, respectively.

As can be seen from FIG. 5, according to Example 1, the aberrations of a spherical surface, astigmatism and distortion are corrected excellently, and an imaging lens including an optical unit that is excellent in image forming performance can be obtained.

Figure 6:
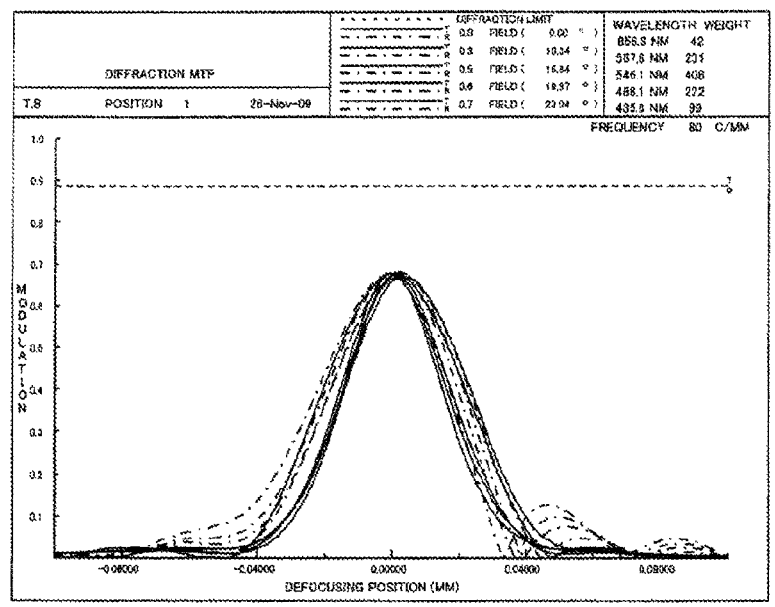
FIG. 6 is a view illustrating the defocus characteristics of MTF from on-axis to 70% of an image height, viewed in 80 lps/mm of Example 1.

FIG. 6 is a view illustrating the defocus characteristics of MTF from on-axis to 70% of an image height, viewed in 80 lps/mm of Example 1.

Figure 2:
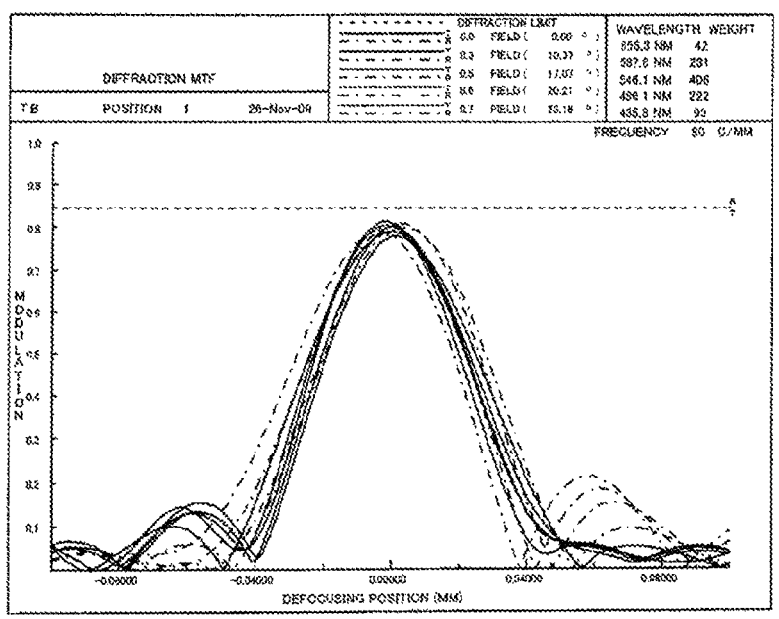
FIG. 2 is a view illustrating typical MTF characteristics of when a lens unit for ¼ size is designed with a current four-group/four-element lens.

Moreover, as described above, FIG. 1 similarly illustrates the defocus characteristics of MTF from on-axis to 70% of an image height, viewed in 80 lps/mm of the current three-group/three-element design. FIG. 2 similarly illustrates the defocus characteristics of MTF from on-axis to 70% of an image height, viewed in 80 lps/mm of the current four-group/four-element design. These are designed on conditions similar to those of Example 1.

When they are seen from the range of defocus where MTF becomes 0, Example 1 is 80 μm, the three-group/three-element and Fno 2.9 is 100 μm, and the four-group/four-element and Fno 2.9 is 80 μm.

The depth of field is normally inversely proportional to Fno if the focal length is the same.

For example, the four-group/four-element and Fno 2.9 has a depth of field of 80 μm×2.1/2.9=58 μm given that Fno is set to 2.1.

However, in this example, even if Fno is 2.1, a depth of field of 80 μm is ensured, and also a high MTF is maintained, and therefore, it can be seen that it is a bright lens being more suitable for practical use.

<2. Second Embodiment>

Figure 7:
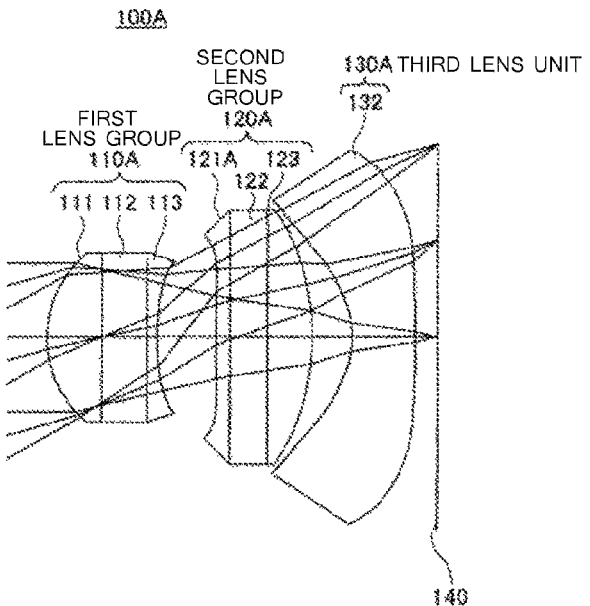
FIG. 7 is a view illustrating a configuration example of an imaging lens according to a second embodiment of the present invention.

FIG. 7 is a view illustrating a configuration example of an imaging lens according to a second embodiment of the present invention.

In an imaging lens 100A according to the second embodiment shown in FIG. 7, a second lens group 120A is formed of a conjugate of a third lens element 121A, a second transparent body 122, and a fourth lens element 123, similarly to the first lens group.

A third lens group 130A is formed of a fifth lens element 132.

In the imaging lens 100A, each lens group is constructed as follows.

A first lens group 100A has a first lens element 111 of a plano-convex shape and, for example, an Abbe number of 53.1, which is adhered to an object side of a glass plate equivalent to BK7, and a second lens element 113 of an Abbe number of 30 and a plano-concave shape, which is adhered to the opposite side.

Here, a diaphragm is realized by previously attaching a material having little transmission such as a chrome film to the object side of the glass substrate.

Similarly, an IR cut filter is also previously attached by vapor deposition onto the glass substrate.

From these, the chromatic aberration is corrected in the first lens group 110A, and it is also possible to have a structure that can easily remove the entire aberration. The first lens group 110A as a whole has a strong positive power and greatly contributes to shortening of an optical length.

The second lens group 120A is formed of a lens in the hybrid (HYBRID) method using a glass substrate, and the third lens elements 121A of, for example, an Abbe number of 30 are adhered to the front and back of the glass substrate equivalent to BK7.

The characteristics are not being bent largely and having a positive power.

This is because especially the first lens group 110A and the third lens group 130A greatly contribute to aberration correction, and accordingly it becomes unnecessary to bend the second lens group 120A.

Without large bending, it is possible to accurately perform AR coating, and ghosting and flare are unlikely to occur.

Moreover, the thickness of the lens can be made thin, which facilitates manufacture and therefore it becomes an advantage.

The third lens group 130A is constructed of a plastic molded lens made out of polycarbonate or a heat resistant resin, and has a large negative power and a large incident surface, and is bent to the object side.

The center of curvature comes close to the diaphragm and therefore the astigmatism aberration and the coma aberration are corrected excellently.

Moreover, since the shape does not deviate greatly from the spherical shape, it is possible to realize a bright lens that has few changes in astigmatism aberration with respect to an incident NA due to an image height.

Moreover, an outgoing side surface has a shape that is also bent substantially to the object side, and orients a convex shape to the image side, which is a structure where ghosting is unlikely to occur. Moreover, the incidence angle of light on an imager is suppressed low up until the perimeter and desirable performance can be obtained as the characteristics of a camera.

From these, the second embodiment can realize a bright lens having a short total optical length and being suitable for practical use, similarly to the first embodiment.

Figure 8:
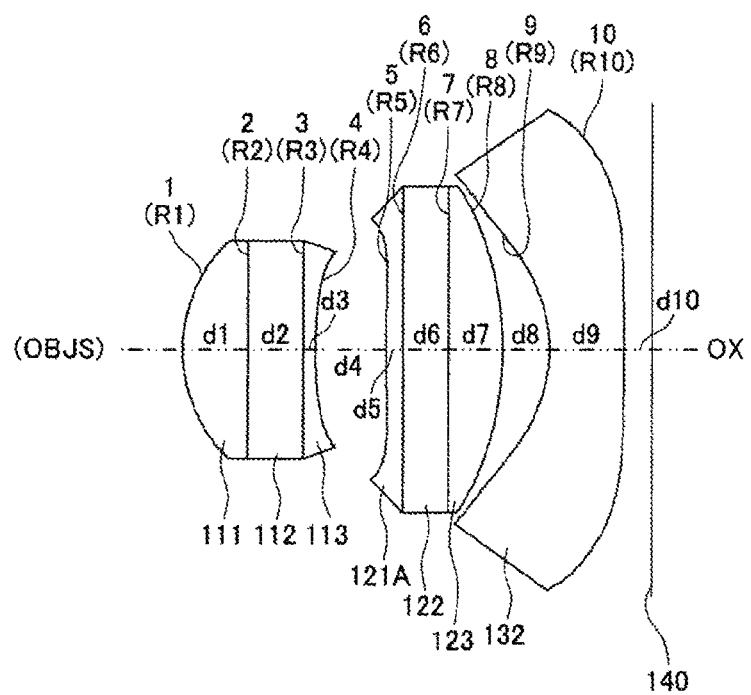
FIG. 8 is a view illustrating surface numbers assigned to lenses constituting lens groups, substrates, and a cover glass constituting an imaging unit of the imaging lens according to the second embodiment.

FIG. 8 is a view illustrating surface numbers assigned to lenses constituting lens groups, substrates, and a cover glass constituting an imaging unit of the imaging lens according to the second embodiment.

Specifically, a surface number of number one is assigned to an object side surface (convex surface) of the first lens element 111, and a surface number of number two to a boundary surface (joint surface) between an image plane side surface of the first lens element 111 and an object side surface of the transparent body.

A surface number of number three is assigned to a boundary surface (joint surface) between an image plane side surface of the transparent body 112 and an object side surface of the second lens element 113.

A surface number of number four is assigned to an image plane side surface of the second lens element 113.

A surface number of number five is assigned to an object side surface of the third lens element 121A, and a surface number of number six to a boundary surface (joint surface) between an image plane side surface of the third lens element 121A and an object side surface of the second transparent body 122.

A surface number of number seven is assigned to a boundary surface (joint surface) between an image plane side surface of the second transparent body 122 and an object side surface of the fourth lens element 123.

A surface number of number eight is assigned to an image plane side surface of the fourth lens element 123.

A surface number of number nine is assigned to an object side surface of the fifth lens element 132, and a surface number of number ten to an image plane side surface of the fifth lens element 132.

Moreover, as shown in FIG. 8, in the imaging lens 100A of the embodiment, the radius of the center of curvature of the object side surface (number one) 1 of the first lens element 111 is set as R1.

The radius of the center of curvature of the boundary surface (joint surface) 2 between the image plane side surface of the first lens element 111 and the object side surface of the transparent body 112 is set as R2.

The radius of the center of curvature of the boundary surface (joint surface) 3 between the image plane side surface of the transparent body 112 and the object side surface of the second lens element 113 is set as R3.

The radius of the center of curvature of the image plane side surface 4 of the second lens element 113 is set as R4.

The radius of the center of curvature of the object side surface (number five) 1 of the third lens element 121A is set as R5.

The radius of the center of curvature of the boundary surface (joint surface) 6 between the image plane side surface of the third lens element 121A and the object side surface of the second transparent body 122 is set as R6.

The radius of the center of curvature of the boundary surface (joint surface) 7 between the image plane side surface of the second transparent body 122 and the object side surface of the fourth lens element 123 is set as R7.

The radius of the center of curvature of the image plane side surface 8 of the fourth lens element 123 is set as R8.

The radius of the center of curvature of the object side surface 9 of the fifth lens element 132 is set as R9, and the radius of the center of curvature of the image plane side surface 10 of the fifth lens element 132 as R10.

The radii of the center of curvature R2, R3, R6, and R7 of the surfaces 2, 3, 6 and 7 are infinite (INFINITY).

Moreover, as shown in FIG. 8, the distance on an optical axis OX between the surfaces 1 and 2, the distance being the thickness of the first lens element 111, is set as d1, and the distance on the optical axis OX between the surfaces 2 and 3, the distance being the thickness of the transparent body 112, is set as d2.

The distance on the optical axis OX between the surfaces 3 and 4, the distance being the thickness of the second lens element 113, is set as d3, and the distance on the optical axis OX between the image plane side surface 4 of the second lens element 113 and the object side surface 5 of the third lens element 121A is set as d4.

The distance on the optical axis OX between the surfaces 5 and 6, the distance being the thickness of the third lens element 121A, is set as d5, and the distance on the optical axis OX between the surfaces 6 and 7, the distance being the thickness of the second transparent body 122, is set as d6.

The distance on the optical axis OX between the surfaces 7 and 8, the distance being the thickness of the fourth lens element 123, is set as d7, and the distance on the optical axis OX between the image plane side surface 8 of the fourth lens element 123 and the object side surface 9 of the fifth lens element 132 is set as d8.

The distance on the optical axis OX between the surfaces 9 and 10, the distance being the thickness of the fifth lens element 132, is set as d9, and the distance between the image plane side surface 10 of the fifth lens element 132 and the image plane 140 is set as d10.

Example 2 will be shown below with specific numerical values of the imaging lens. In Example 2, the surface numbers shown in FIG. 8 are assigned to the lens elements glass substrates (transparent bodies) and the imaging plane 140 constituting an imaging unit of the imaging lens 100A.

EXAMPLE 2

Tables 5, 6, 7 and 8 show numerical values of Example 2. The numerical values of Example 2 correspond to the imaging lens 100A of FIG. 7.

Example 2 is a design example for a 5-megapixel (Mage pixel) CMOS imager of ¼ size and 1.4 µm pitch.

Table 5 shows the radii of curvature (R: mm), distances (d: mm), refractive indices (nd), and variances (vd) of the lens elements, the glass substrates (transparent bodies), and the like, which correspond to the surface numbers of the imaging lens in Example 2.

TABLE 5

Example 2 Configuration Data

| Surface Number | R | d | nd | vd |
|---|---|---|---|---|
| 1: | 1.374 | 0.600 | 1.51 | 53.1 |
| 2: | INFINITY | 0.500 | 1.52 | 64.2 |
| 3: | INFINITY | 0.110 | 1.60 | 30.0 |
| 4: | 3.902 | 0.649 | | |
| 5: | 14.528 | 0.156 | 1.60 | 30.0 |
| 6: | INFINITY | 0.418 | 1.52 | 64.2 |
| 7: | INFINITY | 0.500 | 1.60 | 30.0 |
| 8: | −2.868 | 0.435 | | |
| 9: | −1.251 | 0.700 | 1.59 | 30.0 |
| 10: | −15.033 | 0.250 | | |

Table 6 shows the fourth, sixth, eighth and tenth order aspheric coefficients of the surface 1 of the first lens element 111 that includes an aspheric surface in Example 2, the surface 4 of the second lens element 113, the surface 5 of the third lens element 121A, and the surface 8 of the fourth lens element 123.

Furthermore, shown are the fourth, sixth, eighth and tenth order aspheric coefficients of the surface 9 of the fifth lens element 132, and the surface 10 of the fifth lens element 132.

In Table 6, K represents a conic constant, A a fourth order aspheric coefficient, B a sixth order aspheric coefficient, C an eighth order aspheric coefficient, and D a tenth order aspheric coefficient, respectively.

TABLE 6

Example 2 Aspheric Data

| First Surface: | K−0.551 | A: 0.179E−01 | B: 0.315E−01 | C: −0.251E−01 | D: 0.194E−01 |
|---|---|---|---|---|---|
| Fourth Surface: | K: 10.000 | A: 0.289E−01 | B: 0.762E−01 | C: −0.143E+00 | D: 0.174E+00 |
| Fifth Surface: | K: 10.000 | A: −0.248E−01 | B: −0.260E−01 | C: 0.121E−01 | D: −0.184E−01 |
| Eighth Surface: | K: −4.839 | A: 0.156E−01 | B: −0.513E−01 | C: 0.277E−01 | D: −0.536E−02 |
| Ninth Surface: | K: −3.163 | A: −.457E−01 | B: −0.812E−01 | C: 0.684E−01 | D: −0.137E−01 |
| Tenth Surface: | K: −10.000 | A: 0.434E−01 | B: −0.464E−01 | C: 0.123E−01 | D: −0.116E−02 |

Table 7 specifically shows the focal length f, numerical aperture F, half angle of view ω, and lens length H of the imaging lens 100 in Example 2.

Here, the focal length f is set to 3.65 [mm], the numerical aperture F to 2.1, the half angle of view ω to 31.6 deg, and the lens length H to 4.32 [mm].

TABLE 7

Example 2 Configuration Data

| f (Focal Length) = 3.65 mm |
| F (Numerical Aperture) = 2.1 |
| ω (Half Angle of View) = 31.6 deg |
| H (Total Lens Length) = 4.32 mm |

Table 8 shows that the above conditional expressions (1) to (11) are satisfied in Example 2.

TABLE 8

Values of Conditional Expressions by Example

| Conditional Expression | Example 2 |
|---|---|
| (1) | −0.67 |
| (2) | −0.34 |
| (3) | 1.04 |
| (4) | 1.12 |
| (5) | −0.65 |
| (6) | 31.6 |
| (7) | 53.1 |
| (8) | 30 |
| (9) | 2.1 |
| (10) | 1.18 |
| (11) | 0.25 |

As shown in Table 8, in Example 2, the bending factor qL2 of the second lens group 120 is set to −0.67, and the condition defined in conditional expression (1) is satisfied.

The incident surface of the third lens 130 group (the paraxial quantity of the third lens group) RL3S1/f is set to −0.34, and the condition defined in conditional expression (2) is satisfied.

The focal length fg1 of the first lens group 110 is set to 1.04, and the condition defined in conditional expression (3) is satisfied.

The combined focal length fg2 of the second lens group 120 is set to 1.12, and the condition defined in conditional expression (4) is satisfied.

The combined focal length fg3 of the fourth lens group 130 is set to −0.65, and the condition defined in conditional expression (5) is satisfied.

The half angle of view ω is set to 31.6, and the condition defined in conditional expression (6) is satisfied.

The Abbe number vE1 of the first lens element 111 is set to 53.1, and the condition defined in conditional expression (7) is satisfied.

The Abbe number vE2 of the second lens element 113 is set to 30, and the condition defined in conditional expression (8) is satisfied.

The F-number Fno of the lens system is set to 2.1, and the condition defined in conditional expression (9) is satisfied.

The optical length TT of the lens system is set to 1.18, and the condition defined in conditional expression (10) is satisfied.

The back focus length FB of the lens system is set to 0.25, and the condition defined in conditional expression (11) is satisfied.

Figure 9:
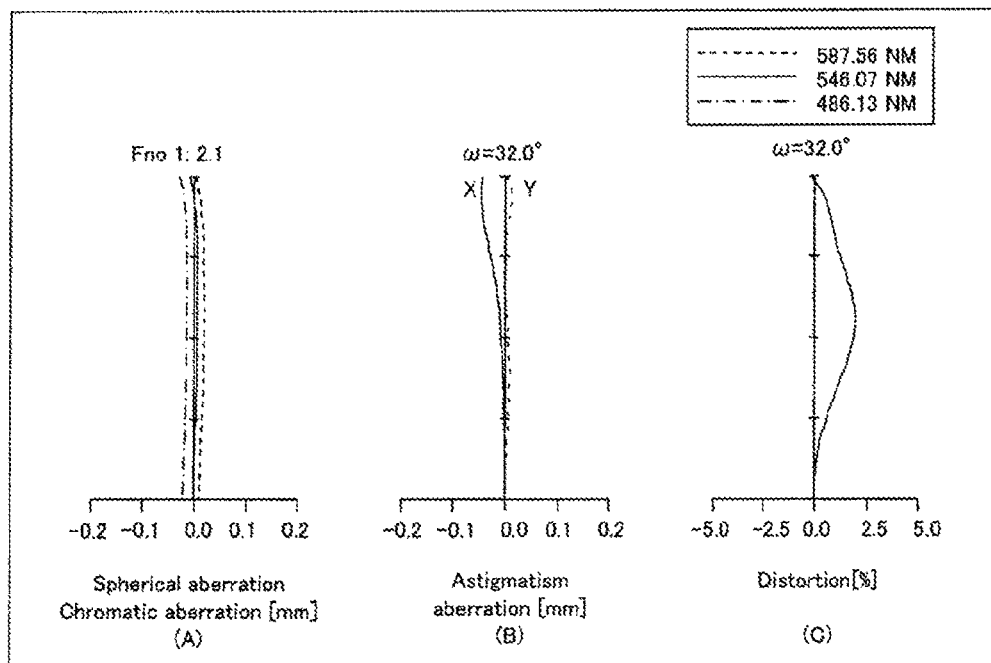
FIG. 9 is an aberration diagram illustrating spherical aberration, astigmatism aberration, and distortion in Example 2.

FIG. 9 is an aberration diagram illustrating spherical aberration (chromatic aberration), astigmatism aberration, and distortion in Example 2. (A) in FIG. 9 represents the spherical aberration (chromatic aberration), (B) in FIG. 9 the astigmatism aberration, and (C) in FIG. 9 the distortion, respectively.

As can be seen from FIG. 9, according to Example 2, the aberrations of a spherical surface, astigmatism and distortion are corrected excellently, and an imaging lens including an optical unit that is excellent in image forming performance can be obtained.

<3. Third Embodiment>

Figure 10:
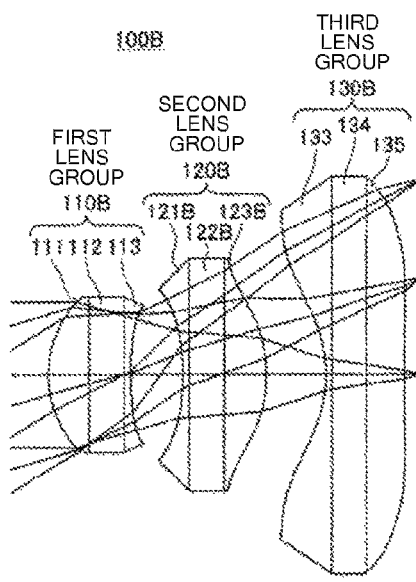
FIG. 10 is a view illustrating a configuration example of an imaging lens according to a third embodiment of the present invention.

FIG. 10 is a view illustrating a configuration example of an imaging lens according to a third embodiment of the present invention.

In an imaging lens 100B according to the third embodiment shown in FIG. 10, a second lens group 120A is formed of a conjugate of a third lens element 121B, a second transparent body 122B, and a fourth lens element 123B, similarly to the first lens group.

Similarly, a third lens group 130B is formed of a conjugate of a fifth lens element 133, a third transparent body 134, and a sixth lens element 135, similarly to the first and second lens groups.

In the imaging lens 100B, each lens group is constructed as follows.

A first lens group 110B has a first lens element 111 of a plano-convex shape and, for example, an Abbe number of 53.1, which is adhered to an object side of a glass plate equivalent to BK7, and a second lens element 113 of an Abbe number of 30 and a plano-concave shape, which is adhered to the opposite side.

Here, a diaphragm is realized by previously attaching a material having little transmission such as a chrome film to the object side of the glass substrate.

Similarly, an IR cut filter is also previously attached by vapor deposition onto the glass substrate.

From these, the chromatic aberration is corrected in the first lens group 110, and it is also possible to have a structure that can easily remove the entire aberration.

The first lens group 110B as a whole has a strong positive power and greatly contributes to shortening of an optical length.

The second lens group 120B is formed of a lens in the hybrid (HYBRID) method using a glass substrate, and lens elements of, for example, an Abbe number of 30 are adhered to the front and back of the glass substrate equivalent to BK7.

The characteristics are not being bent largely and having a positive power.

This is because especially the first lens group 110 and the third lens group 130B greatly contribute to aberration correction, and accordingly it becomes unnecessary to bend the second lens group 120B.

Without large bending, it is possible to accurately perform AR coating, and ghosting and flare are unlikely to Occur.

Moreover, the thickness of the lens can be made thin, which facilitates manufacture and therefore it becomes an advantage.

The third lens group 130B is also formed of a lens in the hybrid (HYBRID) method, and the fifth lens element 133 of a substantially plano-concave shape and, for example, an Abbe number of 30.0 is adhered to an object side of the glass substrate equivalent to BK7. In the third lens group 130B, the sixth lens element 135 of an Abbe number of 30 and a substantially plano-convex shape is adhered to the opposite side.

The third lens group 130B has a large negative power and a large incident surface, and is bent to the object side.

The center of curvature comes close to the diaphragm and therefore the astigmatism aberration and the coma aberration are corrected excellently.

Moreover, since the shape does not deviate greatly from the spherical shape, it is possible to realize a bright lens that has few changes in astigmatism aberration with respect to an incident NA due to an image height.

Moreover, an outgoing side surface has a shape that is also bent substantially to the object side, and orients a convex shape to the image side, which is a structure where ghosting is unlikely to occur.

Moreover, the incidence angle of light on an imager is suppressed low up until the perimeter and desirable performance can be obtained as the characteristics of a camera.

From these, a bright lens having a short total optical length and being suitable for practical use can be realized, similarly to the first and second embodiments.

In this manner, if all the three groups are constructed in the hybrid (HYBRID) method, and they are joined in a wafer form, they are difficult to cut off.

Since the yield depends on the size of the third lens group, a space between the first lens group and the second lens group increases and accordingly it is not efficient.

Moreover, the third lens group has a lens much thicker than a wafer thickness, and a problem of manufacture that the wafer suffers some warping arises, and there is a problem that it is difficult to have an accurate profile system.

Therefore, the first- and second-embodiment types are desirable. However, all the three groups may be fabricated in the hybrid (HYBRID) method, only first and second lens groups may be bonded in a wafer form to be diced, and the dice may be bonded to the dice of the third group individually.

Figure 11:
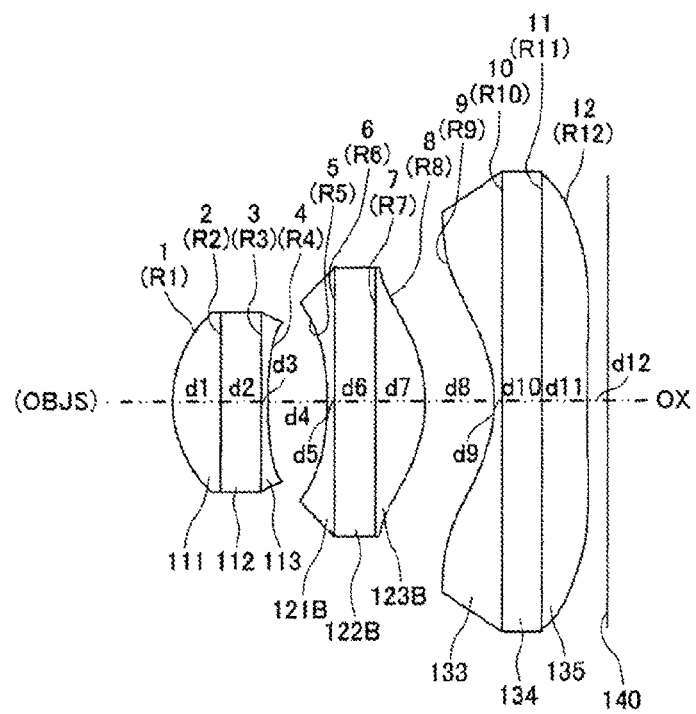
FIG. 11 is a view illustrating surface numbers assigned to lenses constituting lens groups, substrates, and a cover glass constituting an imaging unit of the imaging lens according to the third embodiment.

FIG. 11 is a view illustrating surface numbers assigned to lenses constituting lens groups, substrates, and a cover glass constituting an imaging unit of the imaging lens according to the third embodiment.

Specifically, a surface number of number one is assigned to an object side surface (convex surface) of the first lens element 111, and a surface number of number two to a boundary surface (joint surface) between an image plane side surface of the first lens element 111 and an object side surface of the transparent body.

A surface number of number three is assigned to a boundary surface (joint surface) between an image plane side surface of the transparent body 112 and an object side surface of the second lens element 113.

A surface number of number four is assigned to an image plane side surface of the second lens element 113.

A surface number of number five is assigned to an object side surface of the third lens element 121B, and a surface number of number six to a boundary surface (joint surface) between an image plane side surface of the third lens element 121B and an object side surface of the second transparent body 122B.

A surface number of number seven is assigned to a boundary surface (joint surface) between an image plane side surface of the second transparent body 122B and an object side surface of the fourth lens element 123B.

A surface number of number eight is assigned to an image plane side surface of the fourth lens element 123B.

A surface number of number nine is assigned to an object side surface of the fifth lens element 133, and a surface number of number ten to a boundary surface (joint surface) between an image plane side surface of the fifth lens element 133 and an object side surface of the third transparent body 134.

A surface number of number eleven is assigned to a boundary surface (joint surface) between an image plane side surface of the third transparent body 134 and an object side surface of the sixth lens element 145.

A surface number of number twelve is assigned to an image plane side surface of the sixth lens element 135.

Moreover, as shown in FIG. 11, in the imaging lens 100B of the embodiment, the radius of the center of curvature of the object side surface (number one) 1 of the first lens element 111 is set as R1.

The radius of the center of curvature of the boundary surface (joint surface) 2 between the image plane side surface of the first lens element 111 and the object side surface of the transparent body 112 is set as R2.

The radius of the center of curvature of the boundary surface (joint surface) 3 between the image plane side surface of the transparent body 112 and the object side surface of the second lens element 113 is set as R3.

The radius of the center of curvature of the image plane side surface (concave surface) 4 of the second lens element 113 is set as R4.

The radius of the center of curvature of the object side surface (number five) 1 of the third lens element 121B is set as R5.

The radius of the center of curvature of the boundary surface (joint surface) 6 between the image plane side surface of the third lens element 121B and the object side surface of the second transparent body 122B is set as R6.

The radius of the center of curvature of the boundary surface (joint surface) 7 between the image plane side surface of the second transparent body 122B and the object side surface of the fourth lens element 123B is set as R7.

The radius of the center of curvature of the image plane side surface 8 of the fourth lens element 123B is set as R8.

The radius of the center of curvature of the object side surface 9 of the fifth lens element 133 is set as R9.

The radius of the center of curvature of the boundary surface (joint surface) 10 between the image plane side surface of the fifth lens element 133 and the object side surface of the third transparent body 134 is set as R10.

The radius of the center of curvature of the boundary surface (joint surface) 11 between the image plane side surface of the third transparent body 134 and the object side surface of the sixth lens element 135 is set as R11.

The radius of the center of curvature of the image plane side surface 12 of the sixth lens element 135 is set as R12.

The radii of the center of curvature R2, R3, R6, R7, R10 and R11 of the surfaces 2, 3, 6, 7, 10 and 11 are infinite (INFINITY).

Moreover, as shown in FIG. 11, the distance on an optical axis OX between the surfaces 1 and 2, the distance being the thickness of the first lens element 111, is set as d1, and the distance on the optical axis OX between the surfaces 2 and 3, the distance being the thickness of the transparent body 112, is set as d2.

The distance on the optical axis OX between the surfaces 3 and 4, the distance being the thickness of the second lens element 113, is set as d3, and the distance on the optical axis OX between the image plane side surface 4 of the second lens element 113 and the object side surface 5 of the third lens element 121B is set as d4.

The distance on the optical axis OX between the surfaces 5 and 6, the distance being the thickness of the third lens element 121B, is set as d5, and the distance on the optical axis OX between the surfaces 6 and 7, the distance being the thickness of the second transparent body 122B, is set as d6.

The distance on the optical axis OX between the surfaces 7 and 8, the distance being the thickness of the fourth lens element 123B, is set as d7, and the distance on the optical axis OX between the image plane side surface 8 of the fourth lens element 123B and the object side surface 9 of the fifth lens element 133 is set as d8.

The distance on the optical axis OX between the surfaces 9 and 10, the distance being the thickness of the fifth lens element 133, is set as d9, and the distance on the optical axis OX between the surfaces 10 and 11, the distance being the thickness of the third transparent body 13, is set as d10.

The distance on the optical axis OX between the surfaces 11 and 12, the distance being the thickness of the sixth lens element 135, is set as d11, and the distance between the image plane side surface 12 of the sixth lens element 135 and the image plane 140 is set as d12.

Example 3 will be shown below with specific numerical values of the imaging lens. In Example 3, the surface numbers shown in FIG. 11 are assigned to the lens elements glass substrates (transparent bodies), and the imaging plane 140 constituting an imaging unit of the imaging lens 100B.

EXAMPLE 3

Tables 9, 10, 11 and 12 show numerical values of Example 3. The numerical values of Example 3 correspond to the imaging lens 100B of FIG. 10.

Example 3 is a design example for a 5-megapixel (Mage pixel) CMOS imager of ¼ size and 1.4 μm pitch.

Table 9 shows the radii of curvature (R: mm), distances (d: mm), refractive indices (nd), and variances (vd) of the lens elements, the glass substrates (transparent bodies), and the like, which correspond to the surface numbers of the imaging lens in Example 3.

TABLE 9

Example 3 Configuration Data

| Surface Number | R | d | nd | vd |
|---|---|---|---|---|
| 1: | 1.263 | 0.477 | 1.51 | 53.1 |
| 2: | INFINITY | 0.400 | 1.52 | 64.2 |
| 3: | INFINITY | 0.072 | 1.60 | 30.0 |
| 4: | 4.054 | 0.601 | | |
| 5: | −2.887 | 0.070 | 1.60 | 30.0 |
| 6: | INFINITY | 0.401 | 1.52 | 64.2 |
| 7: | INFINITY | 0.500 | 1.60 | 30.0 |
| 8: | −1.499 | 0.693 | | |
| 9: | −1.440 | 0.070 | 1.60 | 30.0 |
| 10: | INFINITY | 0.400 | 1.52 | 64.2 |
| 11: | INFINITY | 0.457 | 1.60 | 30.0 |
| 12: | −1100.420 | 0.207 | | |

Table 10 shows the fourth, sixth, eighth and tenth order aspheric coefficients of the surface 1 of the first lens element 111 that includes an aspheric surface in Example 3, the surface 4 of the second lens element 113, the surface 5 of the third lens element 121B, and the surface 8 of the fourth lens element 123B.

Furthermore, shown are the fourth, sixth, eighth and tenth order aspheric coefficients of the surface 9 of the fifth lens element 133, and the surface 12 of the sixth lens element 135.

In Table 10, K represents a conic constant, A a fourth order aspheric coefficient, B a sixth order aspheric coefficient, C an eighth order aspheric coefficient, and D a tenth order aspheric coefficient, respectively.

TABLE 10

Example 3 Aspheric Data

| | | | | | | | | |
|---|---|---|---|---|---|---|---|---|
| First Surface: | K: −1.112 | A: 0.708E−01 | B: 0.585E−01 | C: −0.509E−01 | D: 0.670E−01 |
| Fourth Surface: | K: 3.763 | A: 0.502E−01 | B: 0.118E+00 | C: −0.203E+00 | D: 0.401E+00 |
| Fifth Surface: | K: −5.693 | A: −0.132E+00 | B: −0.225E−01 | C: 0.521E−01 | D: −0.212E−01 |
| Eighth Surface: | K: 0.123 | A: 0.431E−01 | B: −0.175E−01 | C: 0.450E−01 | D: −0.243E−02 |
| Ninth Surface: | K: −5.282 | A: −0.118E+00 | B: 0.890E−01 | C: −0.209E−01 | D: 0.165E−02 |
| Twelfth Surface: | K: −10.000 | A: 0.307E−01 | B: −0.315E−01 | C: 0.773E−02 | D: −0.659E−03 |

Table 11 specifically shows the focal length f, numerical aperture F, half angle of view ω, and lens length H of the imaging lens 100B in Example 3.

Here, the focal length f is set to 3.67 [mm], the numerical aperture F to 2.1, the half angle of view ω to 31.4 deg, and the lens length H to 4.35 [mm].

TABLE 11

Example 3 Configuration Data f (Focal Length) = 3.67 mm
F (Numerical Aperture) = 2.1
ω (Half Angle of View) = 31.4 deg
H (Total Lens Length) = 4.35 mm Table 12 shows that the above conditional expressions (1) to (11) are satisfied in Example 3.

TABLE 12

Values of Conditional Expressions by Example

| Conditional Expression | Example 3 |
|---|---|
| (1) | −3.03 |
| (2) | −0.39 |
| (3) | 0.92 |
| (4) | 1.12 |
| (5) | −0.66 |
| (6) | 31.4 |
| (7) | 53.1 |
| (8) | 30 |
| (9) | 2.1 |
| (10) | 1.18 |
| (11) | 0.21 |

As shown in Table 12, in Example 3, the bending factor qL2 of the second lens group 120 is set to −3.03, and the condition defined in conditional expression (1) is satisfied.

The incident surface of the third lens 130 group (the paraxial quantity of the third lens group) RL3S1/f is set to −0.39, and the condition defined in conditional expression (2) is satisfied.

The focal length fg1 of the first lens group 110 is set to 0.93, and the condition defined in conditional expression (3) is satisfied.

The combined focal length fg2 of the second lens group 120 is set to 1.12, and the condition defined in conditional expression (4) is satisfied.

The combined focal length fg3 of the fourth lens group 130 is set to −0.66, and the condition defined in conditional expression (5) is satisfied.

The half angle of view ω is set to 31.4, and the condition defined in conditional expression (6) is satisfied.

The Abbe number vE1 of the first lens element 111 is set to 53.1, and the condition defined in conditional expression (7) is satisfied.

The Abbe number vE2 of the second lens element 113 is set to 30, and the condition defined in conditional expression (8) is satisfied.

The F-number Fno of the lens system is set to 2.1, and the condition defined in conditional expression (9) is satisfied.

The optical length TT of the lens system is set to 1.18, and the condition defined in conditional expression (10) is satisfied.

The back focus length FB of the lens system is set to 0.21, and the condition defined in conditional expression (11) is satisfied.

Figure 12:
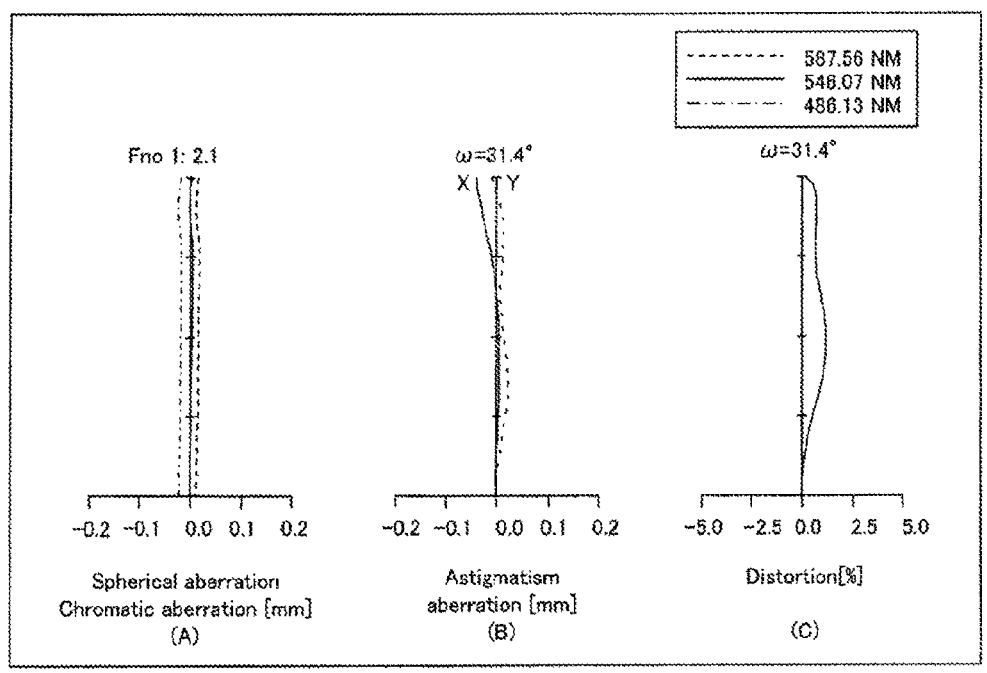
FIG. 12 is an aberration diagram illustrating spherical aberration, astigmatism aberration, and distortion in Example 3.

FIG. 12 is an aberration diagram illustrating spherical aberration (chromatic aberration), astigmatism aberration, and distortion in Example 3. (A) in FIG. 12 represents the spherical aberration (chromatic aberration), (B) in FIG. 12 the astigmatism aberration, and (C) in FIG. 12 the distortion, respectively.

As can be seen from FIG. 12, according to Example 3, the aberrations of a spherical surface, astigmatism and distortion are corrected excellently, and an imaging lens including an optical unit that is excellent in image forming performance can be obtained.

<4. Fourth Embodiment>

Figure 13:
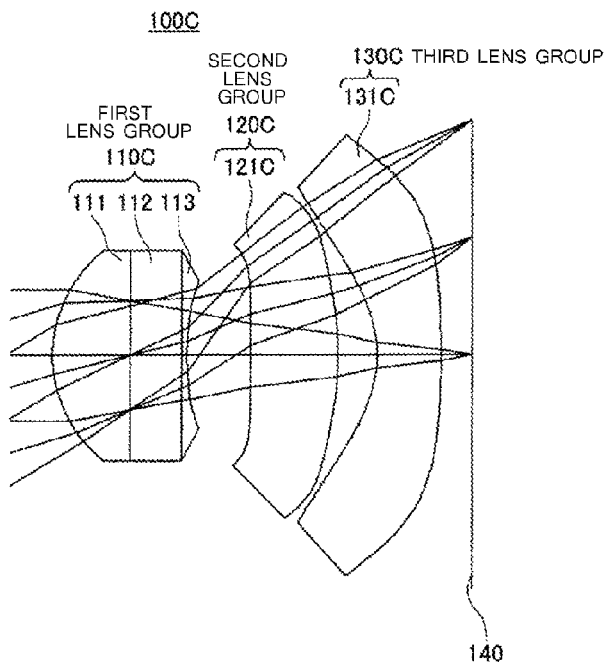
FIG. 13 is a view illustrating a configuration example of an imaging lens according to a fourth embodiment of the present invention.

FIG. 13 is a view illustrating a configuration example of an imaging lens according to a fourth embodiment of the present invention.

An imaging lens 100C according to the fourth embodiment shown in FIG. 13 basically has a similar configuration to that of the imaging lens 110 according to the first embodiment, and as shown below as Example 4, the set values such as parameters of the constituent elements are different.

In the imaging lens 100C, each lens group is constructed as follows.

A first lens group 110C has a first lens element 111 of a plano-convex shape and, for example, an Abbe number of 57.3, which is adhered to an object side of a glass plate equivalent to BK7, and a second lens element 113 of an Abbe number of 30 and a plano-concave shape, which is adhered to the opposite side.

Here, a diaphragm is realized by previously attaching a material having little transmission such as a chrome film to the object side of the glass substrate.

Similarly, an IR cut filter is also previously attached by vapor deposition onto the glass substrate.

From these, the chromatic aberration is corrected in the first lens group 110C, and it is possible to have a structure that can easily remove the entire aberration.

The first lens group 110C as a whole has a strong positive power and greatly contributes to shortening of an optical length.

A second lens group 120C has characteristics of being formed of a plastic molded lens made out of polycarbonate of, for example, an Abbe number of 30, not being bent largely and having a positive power.

This is because especially the first lens group and the third lens group greatly contribute to aberration correction, and accordingly it becomes unnecessary to bend the second lens group 120C.

Without large bending, it is possible to accurately perform AR coating, and ghosting and flare are unlikely to occur. It is possible to use not only a plastic molded lens but also a glass molded lens and a high heat resistant lens of injection molding.

A third lens group 130C is constructed of a plastic molded lens made out of polycarbonate of, for example, an Abbe number of 30 or a heat resistant resin, has a large negative power and a large incident surface, and is bent to the object side.

The center of curvature comes close to the diaphragm and therefore the astigmatism aberration and the coma aberration are corrected excellently.

Moreover, since the shape does not deviate greatly from the spherical shape, it is possible to realize a bright lens that has few changes in astigmatism aberration with respect to an incident NA due to an image height.

Moreover, an outgoing side surface has a shape that is also bent substantially to the object side, and orients a convex shape to the image side, which is a structure where ghosting is unlikely to occur.

Moreover, the incidence angle of light on an imager is suppressed low up until the perimeter and desirable performance can be obtained as the characteristics of a camera.

Example 4 will be shown below with specific numerical values of the imaging lens. In Example 4, the surface numbers shown in FIG. 2 are assigned to the lens elements glass substrate (transparent body) and the imaging plane 140 constituting an imaging unit of the imaging lens 100C.

EXAMPLE 4

Tables 13, 14, 15 and 16 show numerical values of Example 4. The numerical values of Example 4 correspond to the imaging lens 100C of FIG. 13.

Example 4 is a design example for a 5-megapixel (Mage pixel) CMOS imager of ¼ size and 1.4 μm pitch.

Table 13 shows the radii of curvature (R: mm), distances (d: mm), refractive indices (nd), and variances (vd) of the lens elements, the glass substrate (transparent body), and the like, which correspond to the surface numbers of the imaging lens in Example 4.

TABLE 13

Example 4 Configuration Data

| Surface Number | R | d | nd | vd |
|---|---|---|---|---|
| 1: | 1.266 | 0.734 | 1.51 | 57.3 |
| 2: | INFINITY | 0.500 | 1.52 | 64.2 |
| 3: | INFINITY | 0.050 | 1.51 | 57.0 |
| 4: | 3.142 | 0.609 | | |
| 5: | 60.544 | 0.835 | 1.59 | 30.0 |
| 6: | −2.867 | 0.373 | | |
| 7: | −1.130 | 0.600 | 1.59 | 30.0 |
| 8: | −11.518 | 0.300 | | |

Table 14 shows the fourth, sixth, eighth and tenth order aspheric coefficients of the surface 1 of the first lens element 111 that includes an aspheric surface in Example 4, the surface 4 of the second lens element 113, the surface 5 of a third lens element 121, and the surface 6 of the third lens element 121.

Furthermore, shown are the fourth, sixth, eighth and tenth order aspheric coefficients of the surface 7 of a fourth lens element 131, and the surface 8 of the fourth lens element 131.

In Table 14, K represents a conic constant, A a fourth order aspheric coefficient, B a sixth order aspheric coefficient, C an eighth order aspheric coefficient, and D a tenth order aspheric coefficient, respectively.

TABLE 14

Example 4 Aspheric Data

| | | | | | |
|---|---|---|---|---|---|
| First Surface: | K: 0.221E−2 | A: −0.113E−01 | B: 0.804E−02 | C: −0.188E−01 | D: 0.114E−01 |
| Fourth Surface: | K: 3.358 | A: 0.811E−01 | B: −0.248E−01 | C: 0.239E+00 | D: −0.110E+00 |
| Fifth Surface: | K: −10.00 | A: −0.271E−01 | B: −0.724E−01 | C: 0.435E−01 | D: −0.662E−01 |

TABLE 14-continued

Example 4 Aspheric Data

| | | | | | | | | |
|---|---|---|---|---|---|---|---|---|
| Sixth surface: | K: 2.165 | A: 0.597E−01 | B: 0.132E−01 | C: −0.230E−01 | D: 0.480E−02 |
| Seventh Surface: | K: −0.856 | A: 0.732E−01 | B: 0.925E−02 | C: −0.587E−02 | D: 0.849E−03 |
| Eighth Surface: | K: 10.00 | A: −0.246E−01 | B: −0.248E−02 | C: −0.139E−02 | D: 0.319E−03 |

Table 15 specifically shows the focal length f, numerical aperture F, half angle of view ω, and lens length H of the imaging lens 100B in Example 4.

Here, the focal length f is set to 3.61 [mm], the numerical aperture F to 2.9, the half angle of view ω to 31.4 deg, and the lens length H to 4.00 [mm].

TABLE 15

Example 4 Configuration Data f (Focal Length) = 3.61 men
F (Numerical Aperture) = 2.9
ω (Half Angle of View) = 31.4 deg
H (Total Lens Length) = 4.00 mm Table 16 shows that the above conditional expressions (1) to (11) are satisfied in Example 4.

TABLE 16

Values of Conditional Expressions by Example

| Conditional Expression | Example 4 |
|---|---|
| (1) | −0.91 |
| (2) | −0.31 |
| (3) | 0.93 |
| (4) | 1.29 |
| (5) | −0.60 |
| (6) | 31.4 |
| (7) | 57.3 |
| (8) | 30 |
| (9) | 2.9 |
| (10) | 1.108 |
| (11) | 0.3 |

As shown in Table 16, in Example 4, the bending factor qL2 of the second lens group 120 is set to −0.91, and the condition defined in conditional expression (1) is satisfied.

The incident surface of the third lens 130 group (the paraxial quantity of the third lens group) RL3S1/f is set to −0.31, and the condition defined in conditional expression (2) is satisfied.

The focal length fg1 of the first lens group 110 is set to 0.93, and the condition defined in conditional expression (3) is satisfied.

The combined focal length fg2 of the second lens group 120 is set to 1.29, and the condition defined in conditional expression (4) is satisfied.

The combined focal length fg3 of the fourth lens group 130 is set to −0.60, and the condition defined in conditional expression (5) is satisfied.

The half angle of view ω is set to 31.4, and the condition defined in conditional expression (6) is satisfied.

The Abbe number vE1 of the first lens element 111 is set to 57.3, and the condition defined in conditional expression (7) is satisfied.

The Abbe number vE2 of the second lens element 113 is set to 30, and the condition defined in conditional expression (8) is satisfied.

The F-number Fno of the lens system is set to 2.9, and the condition defined in conditional expression (9) is satisfied.

The optical length TT of the lens system is set to 1.108, and the condition defined in conditional expression (10) is satisfied.

The back focus length FB of the lens system is set to 0.3, and the condition defined in conditional expression (11) is satisfied.

Figure 14:
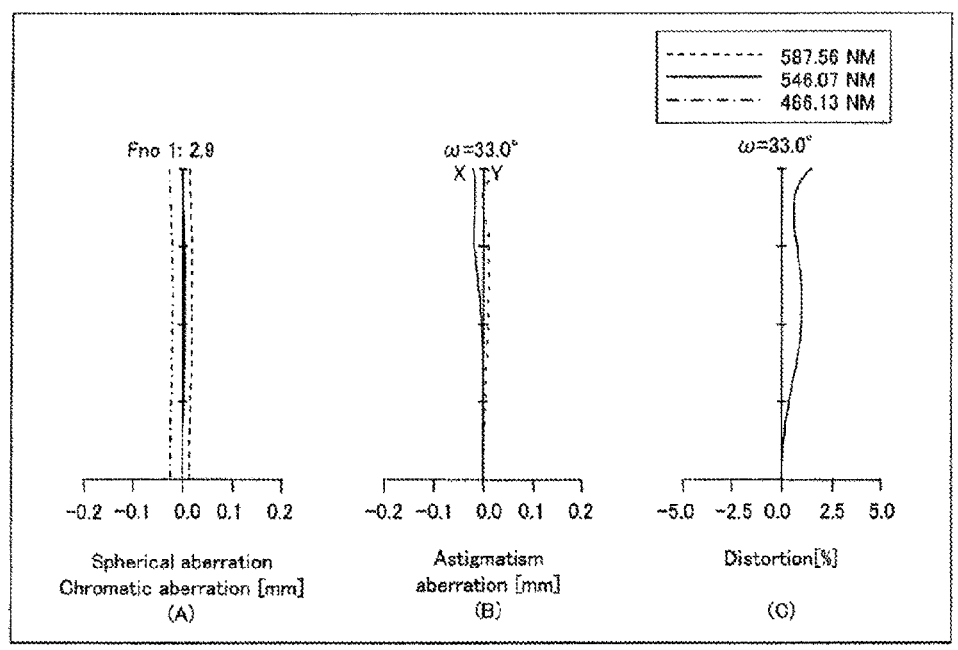
FIG. 14 is an aberration diagram illustrating spherical aberration, astigmatism aberration, and distortion in Example 4.

FIG. 14 is an aberration diagram illustrating spherical aberration (chromatic aberration), astigmatism aberration, and distortion in Example 4. (A) in FIG. 14 represents the spherical aberration (chromatic aberration), (B) in FIG. 14 the astigmatism aberration, and (C) in FIG. 14 the distortion, respectively.

As can be seen from FIG. 14, according to Example 3, the aberrations of a spherical surface, astigmatism and distortion are corrected excellently, and an imaging lens including an optical unit that is excellent in image forming performance can be obtained.

Figure 15:
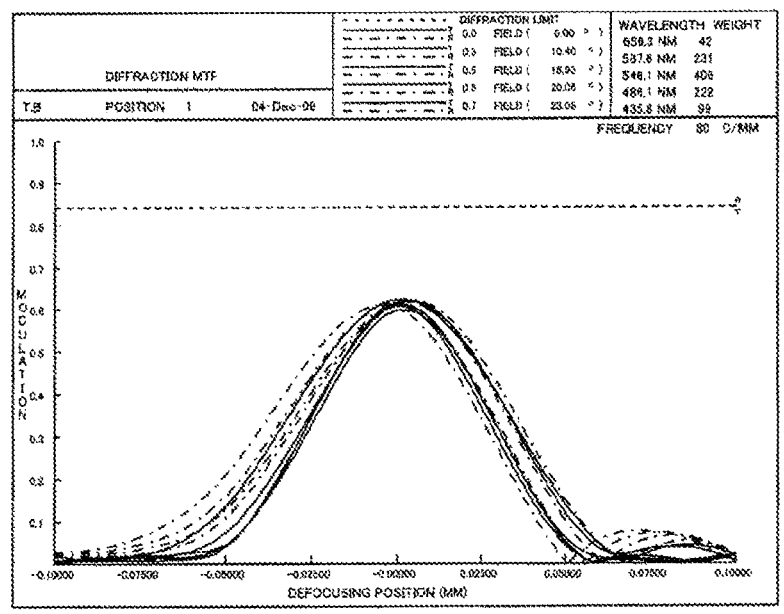
FIG. 15 is a view illustrating the defocus characteristics of MTF from on-axis to 70% of an image height, viewed in 80 lps/mm of Example 4.

FIG. 15 is a view illustrating the defocus characteristics of MTF from on-axis to 70% of an image height, viewed in 80 lps/mm of Example 4.

As can be seen from here, with a depth of field equal to or more than that of FIG. 1 of the three-group/three-element, the embodiment of the present invention has a total optical length as short as 4.0 mm while the three-group/three-element has a total optical length of 4.4 mm.

Consequently, it can be seen that the embodiment of the present invention is adaptable to an optical unit whose depth of field is deep and total optical length is short.

<5. Fifth Embodiment>

Figure 16:
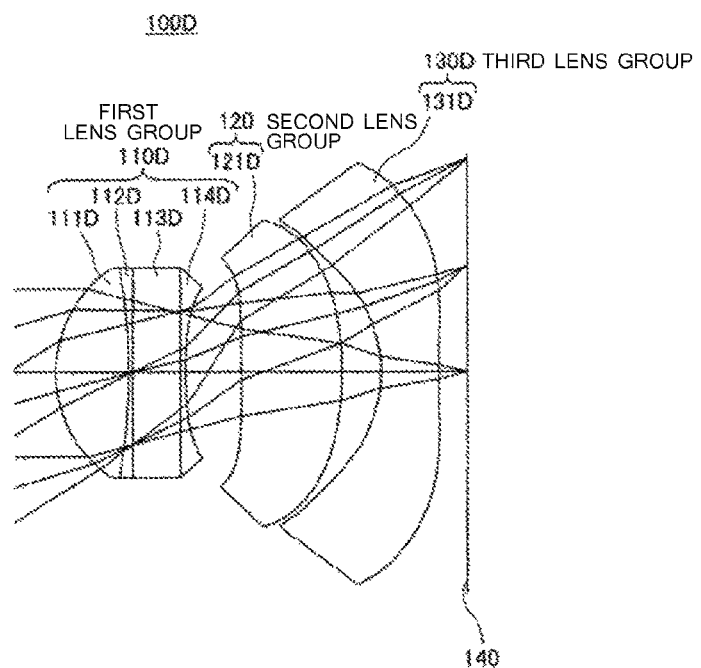
FIG. 16 is a view illustrating a configuration example of an imaging lens according to a fifth embodiment of the present invention.

FIG. 16 is a view illustrating a configuration example of an imaging lens according to a fifth embodiment of the present invention.

An imaging lens 100D according to the fifth embodiment shown in FIG. 16 has the configuration of a first lens group 110D, the configuration being different from those of the other embodiments.

The first lens group 110D is formed of a conjugate of a first lens element 111D, a second lens element 112D, a transparent body 113D, and a third lens element 114.

A second lens group 120D is formed of one fourth lens element 121D.

A third lens group 130D is formed of one fifth lens element 131D.

In the imaging lens 100D, each lens group is constructed as follows.

The first lens group 110D has the first lens element 111D of a biconvex shape and, for example, an Abbe number of 57.3, and the second lens element 113D of a plano-concave shape and an Abbe number of 30.0, which are adhered to an object side of a glass plate equivalent to BK7.

The third lens element 114 of a plano-concave shape and an Abbe number of 30.0 is adhered to the opposite side.

Here, a diaphragm is realized by previously attaching a material having little transmission such as a chrome film to the object side of the glass substrate.

Similarly, an IR cut filter is also previously attached by vapor deposition onto the glass substrate.

Here, the first lens element 111D is constructed of a biconvex lens having a large Abbe number, and the second lens element 112D is formed of a lens of a plano-concave shape and a smaller Abbe number than that of the first lens element.

Both of them construct a doublet structure to have a structure where chromatic aberration is eliminated more than a single structure.

From these, the chromatic aberration is corrected in the first lens group 110D, and it is also possible to have a structure that can easily remove the entire aberration. The first lens group 110D as a whole has a strong positive power and greatly contributes to shortening of an optical length.

The second lens group 120D has characteristics of being constructed by glass molding with, for example, an Abbe number of 31, not being bent largely, and having a positive power.

This is because especially the first lens group and the third lens group greatly contribute to aberration correction, and accordingly it becomes unnecessary to bend the second lens group 120D.

Without large bending, it is possible to accurately perform AR coating, and ghosting and flare are unlikely to occur. It is possible to use not only a plastic molded lens but also a glass molded lens and a high heat resistant lens of injection molding.

The third lens group 30D is constructed of a plastic molded lens made out of polycarbonate or a heat resistant resin, and has a large negative power and a large incident surface, and is bent to the object side.

The center of curvature comes close to the diaphragm and therefore the astigmatism aberration and the coma aberration are corrected excellently.

Moreover, since the shape does not deviate greatly from the spherical shape, it is possible to realize a bright lens that has few changes in astigmatism aberration with respect to an incident NA due to an image height.

Moreover, an outgoing side surface has a shape that is also bent substantially to the object side, and orients a convex shape to the image side, which is a structure where ghosting is unlikely to occur.

Moreover, the incidence angle of light on an imager is suppressed low up until the perimeter and desirable performance can be obtained as the characteristics of a camera.

From these, a bright lens whose total optical length is short can be realized.

For example, an axial chromatic aberration is 13.7 µm in Example 1 while being suppressed up to 9.0 µm in the example.

In this manner, the embodiment of the present invention makes it possible to fabricate a camera module with a normal optical system having the resolution of a three-element lens configuration, and Fno 2.0, which is very bright, in a 5 megapixel band; however, it is useful to make the first lens group 110D on the incident side a doublet for higher performance.

Hence, it is possible to realize a lens having performance corresponding to the resolution of a four-element configuration with a normal optical system and simultaneously being very bright as Fno 2.0.

Figure 17:
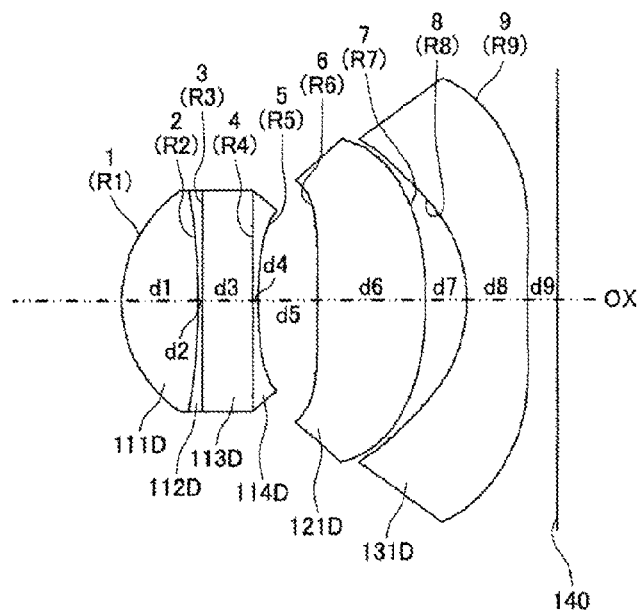
FIG. 17 is a view illustrating surface numbers assigned to lenses constituting lens groups, a substrate, and a cover glass constituting an imaging unit of the imaging lens according to the fifth embodiment.

FIG. 17 is a view illustrating surface numbers assigned to lenses constituting lens groups, a substrate, and a cover glass constituting an imaging unit of the imaging lens according to the fifth embodiment.

Specifically, a surface number of number one is assigned to an object side surface (convex surface) of the first lens element 111D, and a surface number of number two to a boundary surface (joint surface) between an image plane side surface of the first lens element 111D and an object side surface of the second lens element 112D.

A surface number of number three is assigned to a boundary surface (joint surface) between an image plane side surface of the second lens element 112D and an object side surface of the transparent body 113D.

A surface number of number four is assigned to a boundary surface (joint surface) between an image plane side surface of the transparent body 113D and an object side surface of the third lens element 114D.

A surface number of number five is assigned to an image plane side surface (concave surface) of the third lens element 114D.

A surface number of number six is assigned to an object side surface (concave surface) of the fourth lens element 121D, and a surface number of number seven to an image plane side surface of the fourth lens element 121D.

A surface number of number eight is assigned to an object side surface (concave surface) of the fifth lens element 131D, and a surface number of number nine to an image plane side surface of the fifth lens element 131D.

Moreover, as shown in FIG. 17, in the imaging lens 100D of the embodiment, the radius of the center of curvature of the object side surface (number one) 1 of the first lens element 111D is set as R1.

The radius of the center of curvature of the boundary surface (joint surface) 2 between the image plane side surface of the first lens element 111D and the object side surface of the second lens element 112D is set as R2.

The radius of the center of curvature of the boundary surface (joint surface) 3 between the image plane side surface of the second lens element 112D and the object side surface of the transparent body 113D is set as R3.

The radius of the center of curvature of the boundary surface (joint surface) 4 between the image plane side surface of the transparent body 113D and the object side surface of the third lens element 114D is set as R4.

The radius of the center of curvature of the image plane side surface (concave surface) 5 of the third lens element 114D is set as R5.

The radius of the center of curvature of the object side surface (concave surface) 6 of the fourth lens element 121D is set as R6, and the radius of the center of curvature of the image plane side surface 7 of the third lens element 121D as R7.

The radius of the center of curvature of the object side surface (concave surface) 8 of the fifth lens element 131D is set as R8, and the radius of the center of curvature of the image plane side surface 9 of the fifth lens element 131D as R9.

The radii of the center of curvature R3 and R4 of the surfaces 3 and 4 are infinite (INFINITY).

Moreover, as shown in FIG. 17, the distance on an optical axis OX between the surfaces 1 and 2, the distance being the thickness of the first lens element 111D, is set as d1, and the distance on the optical axis OX between the surfaces 2 and 3, the distance being the thickness of the second lens element 112D, is set as d2.

The distance on the optical axis OX between the surfaces 3 and 4, the distance being the thickness of the transparent body 113D, is set as d3.

The distance on the optical axis OX between the surfaces 4 and 5, the distance being the thickness of the third lens element 114D, is set as d4, and the distance on the optical axis OX between the image plane side surface 5 of the third lens element 114D and the object side surface 6 of the fourth lens element 121D is set as d5.

The distance on the optical axis OX between the surfaces 6 and 7, the distance being the thickness of the fourth lens element 121D, is set as d6, and the distance on the optical axis OX between the image plane side surface 7 of the fourth lens element 121D and the image plane side surface 8 of the fifth lens element 131D is set as d7.

The distance on the optical axis OX between the surfaces 8 and 9, the distance being the thickness of the fifth lens element 131D, is set as d8, and the distance between the image plane side surface 9 of the fifth lens element 131D and the image plane 140 is set as d9.

Table 18 shows the fourth, sixth, eighth and tenth order aspheric coefficients of the surface 1 of the first lens element 111 that includes an aspheric surface in Example 5, the surface 5 of the third lens element 114D, the surface 6 of the fourth lens element 121D, and the surface 7 of the fourth lens element 121D.

Furthermore, shown are the fourth, sixth, eighth and tenth order aspheric coefficients of the surface 8 of the fifth lens element 131D, and the surface 9 of the fifth lens element 131D.

In Table 18, K represents a conic constant, A a fourth order aspheric coefficient, B a sixth order aspheric coefficient, C an eighth order aspheric coefficient, and D a tenth order aspheric coefficient, respectively.

TABLE 18

| Aspheric Data of Example 5 | | | | | |
|---|---|---|---|---|---|
| First Surface: | K: 0.197 | A: −0.159E−01 | B: −0.428E−02 | C: −0.170E−02 | D: −0.554E−02 |
| Fifth Surface: | K: 6.623 | A: 0.589E−01 | B: −0.267E−03 | C: 0.104E+00 | D: −0.205E−01 |
| Sixth surface: | K: −10.000 | A: −0.382E−01 | B: −0.164E−01 | C: −0.924E−02 | D: −0.723E−02 |
| Seventh Surface: | K: 3.191 | A: 0.114E−01 | B: −0.344E−01 | C: 0.163E−01 | D: −0.301E−02 |
| Eighth Surface: | K: −0.776 | A: −0.234E−01 | B: −0.609E−01 | C: 0.548E−01 | D: −0.119E−01 |
| Ninth Surface: | K: −10.000 | A: −0.536E−01 | B: −0.461E−02 | C: 0.397E−02 | D: −0.539E−03 |

Example 5 will be shown below with specific numerical values of the imaging lens. In Example 5, the surface numbers shown in FIG. 17 are assigned to the lens elements glass substrate (transparent body) and the imaging plane 140 constituting an imaging unit of the imaging lens 100F.

EXAMPLE 5

Tables 17, 18, 19 and 306 show numerical values of Example 5. The numerical values of Example 5 correspond to the imaging lens 100D of FIG. 16.

Example 4 is a design example for a 5-megapixel (Mage pixel) CMOS imager of ¼ size and 1.4 μm pitch.

Table 17 shows the radii of curvature (R: mm), distances (d: mm), refractive indices (nd), and variances (vd) of the lens elements, the glass substrate (transparent body), and the like, which correspond to the surface numbers of the imaging lens in Example 5.

TABLE 17

| Example 5 Lens Configuration Data | | | | |
|---|---|---|---|---|
| Surface Number | R | d | nd | vd |
| 1: | 1.336 | 0.755 | 1.51 | 57.3 |
| 2: | −6.356 | 0.040 | 1.60 | 30.0 |
| 3: | INFINITY | 0.500 | 1.53 | 55.0 |
| 4: | INFINITY | 0.050 | 1.60 | 30.0 |
| 5: | 4.313 | 0.576 | | |
| 6: | 162.056 | 1.080 | 1.69 | 31.3 |
| 7: | −3.294 | 0.408 | | |
| 8: | −1.460 | 0.600 | 1.59 | 30.0 |
| 9: | 11.839 | 0.300 | | |

Table 19 specifically shows the focal length f, numerical aperture F, half angle of view ω, and lens length H of the imaging lens 100B in Example 5.

Here, the focal length f is set to 3.66 [mm], the numerical aperture F to 2.1, the half angle of view ω to 33.6 deg, and the lens length H to 4.31 [mm].

TABLE 19

| Configuration Data of Example 5 |
|---|
| f (Focal Length) = 3.66 mm |
| F (Numerical Aperture) = 2.1 |
| ω (Half Angle of View) = 33.6 deg |
| H (Total Lens Length) = 4.31 mm |

Table 20 shows that the above conditional expressions (1) to (11) are satisfied in Example 5.

TABLE 20

| Values of Conditional Expressions by Example | |
|---|---|
| Conditional Expression | Example 5 |
| (1) | −0.96 |
| (2) | −0.40 |
| (3) | 0.98 |
| (4) | 1.27 |
| (5) | −0.59 |
| (6) | 33.6 |
| (7) | 57.3 |
| (8) | 30.0 |
| (9) | 2.1 |
| (10) | 1.18 |
| (11) | 0.3 |

As shown in Table 20, in Example 5, the bending factor qL2 of the second lens group 120 is set to −0.96, and the condition defined in conditional expression (1) is satisfied.

The incident surface of the third lens 130 group (the paraxial quantity of the third lens group) RL3S1/f is set to −0.40, and the condition defined in conditional expression (2) is satisfied.

The focal length fg1 of the first lens group 110 is set to 0.98, and the condition defined in conditional expression (3) is satisfied.

The combined focal length fg2 of the second lens group 120 is set to 1.27, and the condition defined in conditional expression (4) is satisfied.

The combined focal length fg3 of the fourth lens group 130 is set to −0.59, and the condition defined in conditional expression (5) is satisfied.

The half angle of view ω is set to 33.6, and the condition defined in conditional expression (6) is satisfied.

The Abbe number vE1 of the first lens element 111 is set to 57.3, and the condition defined in conditional expression (7) is satisfied.

The Abbe number vE2 of the second lens element 113 is set to 30, and the condition defined in conditional expression (8) is satisfied.

The F-number Fno of the lens system is set to 2.1, and the condition defined in conditional expression (9) is satisfied.

The optical length TT of the lens system is set to 1.18, and the condition defined in conditional expression (10) is satisfied.

The back focus length FB of the lens system is set to 0.3, and the condition defined in conditional expression (11) is satisfied.

Figure 18:
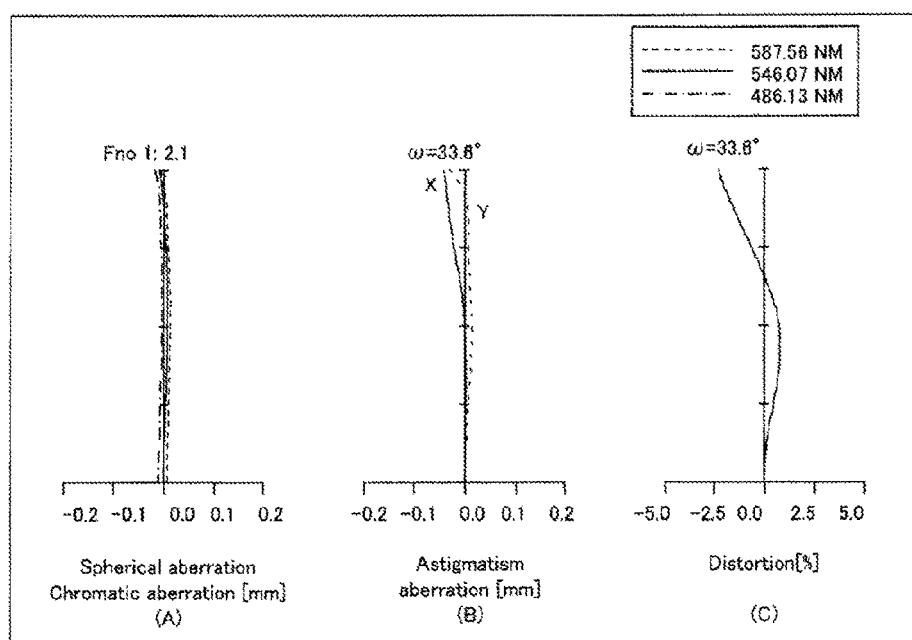
FIG. 18 is an aberration diagram illustrating spherical aberration, astigmatism aberration, and distortion in Example 5.

FIG. 18 is an aberration diagram illustrating spherical aberration (chromatic aberration), astigmatism aberration, and distortion in Example 5. (A) in FIG. 18 represents the spherical aberration (chromatic aberration), (B) in FIG. 18 the astigmatism aberration, and (C) in FIG. 18 the distortion, respectively.

As can be seen from FIG. 18, according to Example 3, the aberrations of a spherical surface, astigmatism and distortion are corrected excellently, and an imaging lens including an optical unit that is excellent in image forming performance can be obtained.

<6. Sixth Embodiment>

Figure 19:
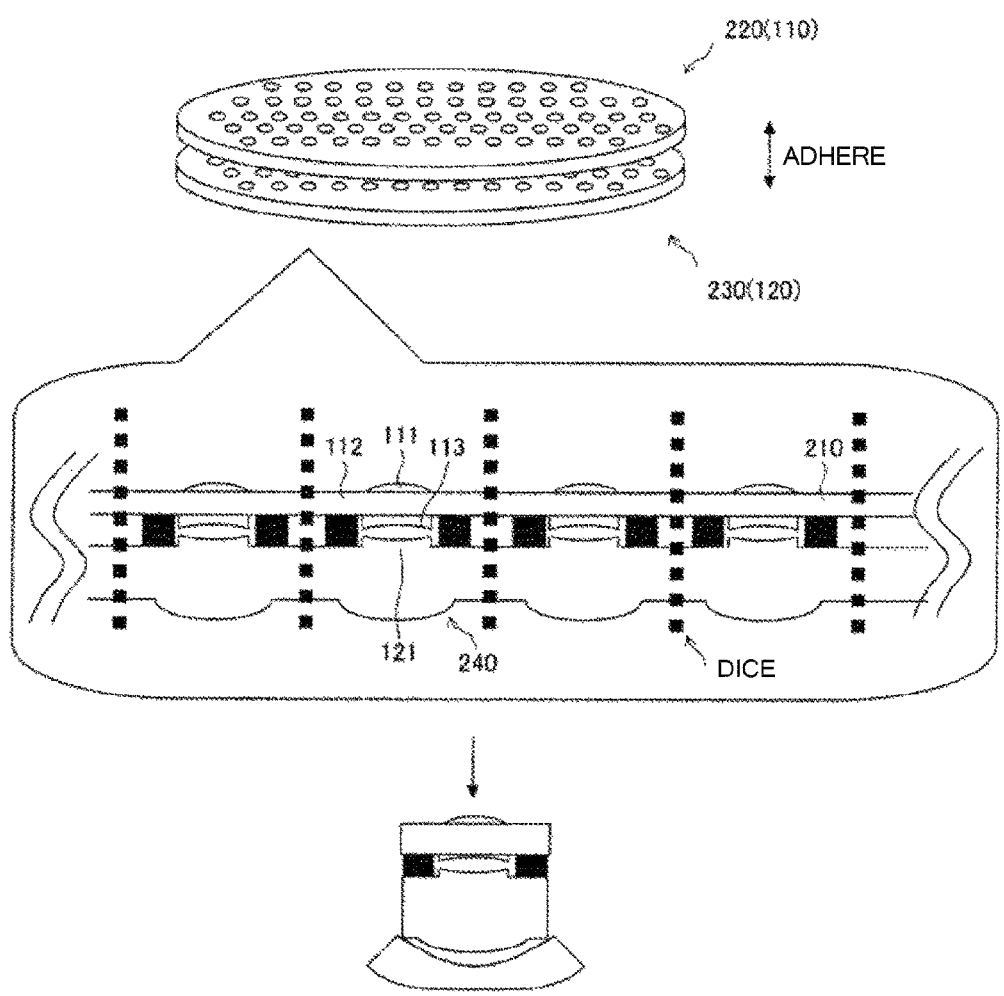
FIG. 19 is a view conceptually illustrating wafer-level optics according to a sixth embodiment of the present invention.

FIG. 19 is a view conceptually illustrating wafer-level optics according to a sixth embodiment of the present invention.

A plurality of replica lenses is formed on and under a glass substrate 210 to form a first group 220 (110). A second group 230 (120) is also constructed similarly.

Next, the individual lens groups are diced out.

Moreover, a lens made out of a single glass material forms a third group 240 (130), and a diced piece of the first group 220 and the second group 230 is bonded to the third group 240 to assemble a lens.

The optical unit according to the embodiment described in detail above can be basically formed with the following characteristics.

As described above, conditional expressions (1) to (11) are common to the first to forth embodiments (Examples 1 to 4), and are appropriately adopted as necessary to realize more preferable image forming performance and a compact optical system, which are suitable for individual imaging elements or imaging apparatuses.

As describe above, the optical unit of the embodiment is basically constructed of the first lens group 110, the second lens group 120 and the third lens group 130.

The first lens group has replica lenses on and under a glass substrate, and includes the first lens element, the first transparent substrate, and the second lens element, which are arranged in order from the object side to the image plane side.

A glass plate equivalent to BK7 manufactured by Schott is used for the transparent substrate to manufacture at low cost, and light shielding means such as a chrome film is processed on the glass substrate to form a diaphragm.

Hence, the thickness is at an almost negligible level unlike those of a normal molded product or sheet, and therefore there is no ghost or flare caused by the thickness and no vignetting in the corners. Moreover, an IR cut filter is also attached to the glass substrate.

Consequently, an IR cut filter that is normally placed between a lens element and an imaging element becomes unnecessary. Accordingly, it is possible to shorten a back focus and therefore the degree of freedom of optical design increases, and it is possible to design with better optical characteristics.

Moreover, since these two parts can be attached to a glass substrate, it is possible to make an inexpensive and highly reliable device having a small number of parts.

Furthermore, different lens materials can be used for the first and second lens elements, and it is possible to fabricate an optical element that is more excellent in optical characteristics than the conventional three-group lens element.

Moreover, it is possible to make the outermost part of an effective optical system thinner if the first lens element is formed on the glass substrate to make a diaphragm under the first lens element than if being constructed of an existing glass molded lens or a plastic molded lens.

Also from this point, it is possible to improve optical characteristics.

Moreover, it is also possible to further make the first lens element a doublet lens, further reduce chromatic aberration, and further increase resolution.

The second lens group has the characteristic of not being bent largely.

This is because especially the first lens group and the third lens group greatly contribute to aberration correction, and accordingly it becomes unnecessary to bend the second lens group.

Without large bending, it is possible to accurately perform AR coating, and ghosting and flare are unlikely to occur. It is possible to use not only a plastic molded lens but also a glass molded lens and a high heat resistant lens of injection molding.

Moreover, it is also possible to use a HYBRID type using a glass substrate, and also in here, if the bending is little, the thickness of the lens can be made thin, which facilitates manufacture and therefore it becomes an advantage.

The third lens group has a large negative power and a large incident surface, and is bent to the object side. The center of curvature comes close to the diaphragm and therefore the astigmatism aberration and the coma aberration are corrected excellently.

Moreover, since the shape does not deviate greatly from the spherical shape, it is possible to realize a bright lens that has few changes in astigmatism aberration with respect to an incident NA due to an image height.

Moreover, an outgoing side surface has a shape that is also bent substantially to the object side, and orients a convex shape to the image side, which is a structure where ghosting is unlikely to occur.

Moreover, the incidence angle of light on an imager is suppressed low up until the perimeter and desirable performance can be obtained as the characteristics of a camera.

When a group is seen as a unit, power arrangement takes a configuration of positive, positive and negative, and the aberrations are corrected excellently, and an optical path length can be shortened.

Here, the first lens group is a lens in the hybrid (HYBRID) method, and therefore the first element and the second element can be constructed of different materials, and it is possible to remove chromatic aberration only with the first lens group.

Next, it is possible to construct the positive-power second lens group and the negative-power third lens group, both of them being made out of a glass material whose Abbe number is close to 30.

Moreover, unlike the conventional example, the third lens group does not deviate greatly from the spherical shape, even if being made bright, there are fewer changes in aberration due to an image height, and it is possible to make it a brighter lens.

A main object of the embodiments of the present invention is to provide an optical unit that is optimal to an especially bright, small and fixed-focus (FF) lens with high resolution.

It is generally known that the conventional three-group/three-element lens has a deep depth of field and is optimal to an FF lens.

However, if Fno is decreased, MTF suddenly deteriorates, and approximately Fno 2.4 is the limit. It is considered to adopt a four-group/four-element lens in order to further improve optical characteristics; however, the four-group/four-element lens has a shallow depth of field, and it is difficult to adopt one for an FF lens.

In the embodiment, it is possible to overcome these problems. Fno can be decreased to 2.1 or lower while having a deep depth of field similar to a three-group/three-element lens and can secure a high MTF, and naturally can be used for a dark lens.

All the three groups can be constructed of lenses in the hybrid (HYBRID) method or can be manufactured in a wafer form in a mixture of the hybrid (HYBRID) method and a casting (Casting) method.

Rather in the embodiment, the first lens group is made in a wafer form, is diced and is subsequently assembled with the second and third lens groups.

Otherwise, it is possible to adopt, as potent assembling methods, law of methods such as that the first and second lens groups are made in a wafer form, are diced and are subsequently assembled with the third lens group.

This is because with high pixel number camera modules using the three-group configuration, even if a plurality of modules is simultaneously made in a wafer form, there are large variations in defocus of the individual modules, and they end by being assembled with imaging elements after dicing; accordingly, there is little need to complete a final form in a wafer form.

Rather than that, in order to increase the yield of the first lens group, the first group is made in a wafer form and is assembled after dicing, and each of the third lens groups having a large amount of SAG is fabricated as a molded (Mold) lens to lower the degree of difficulty in manufacture and optimize the whole, and it is possible to decrease the costs.

Outlines of combinable configurations are listed below:
HYBRID+(mold or casting)+(mold or casting)
HYBRID+HYBRID (mold or casting)
HYBRID+HYBRID+HYBIRD
HYBRID+(mold or casting)+HYBRID
(Here, a molded lens may be a replica lens.)
(Moreover, HYBRID may include a doublet structure lens therein.)

According to the embodiment described above, it is possible to obtain the following effects.

According to the embodiment, there are advantages of both of wafer optics in the hybrid (Hybrid) method and an optical unit constructed of a lens made by a normal mold manufacturing method.

A diaphragm can be attached to a glass substrate of the first lens group, and the number of parts can be reduced, which enables cost reduction. Moreover, since unlike an external part, a diaphragm part is not thick, there is no cause of ghosting, and no vignetting in the corners and accordingly optical characteristics improves.

The thickness of the edge of the first lens group can be made thin. Optical characteristics can be improved.

An IR cut filter can also be attached to the glass substrate of the first lens group, and therefore the number of parts can be reduced, which enables cost reduction. Moreover, since an external IR cut filter is unnecessary, the back focus can be shortened, and the degree of freedom of lens design increases. Accordingly, it is possible to make a unit that is more excellent in optical characteristics.

Since wafer optics in the hybrid (HYBRID) method is used for the first lens group, it is possible to use materials having different Abbe numbers for the back and front sides.

Since no lens deviates greatly from the spherical shape, it is possible to have Fno on the bright side.

The curvature of the incident surface of the third lens group comes close to the diaphragm and therefore the astigmatism aberration and the coma aberration are corrected excellently. Moreover, the surface shape is not undulating. Even if this makes the lens bright, there are few changes in aberrations due to an image height, and it is possible to have Fno on the bright side.

The outgoing surface of the third lens group has a substantially convex shape with respect to the image plane. Accordingly, even if the reflection of the image plane (imager) is reflected on this surface, an image is not formed, and ghosting does not occur.

Moreover, the incidence angle of light incident on the imager does not increase on the perimeter, and the desirable characteristics of a camera are held.

The bending of the second lens group is not bent sharply; accordingly, it is possible to accurately add AR coating, and the cause of ghosting does not arise.

Moreover, glass molding can be used. It is possible to stop temperature characteristics.

In units of groups, the power configuration is positive, positive and negative, and in the first lens group, the first element having a positive power and a large Abbe number, and the second element having a negative power and a small Abbe number perform color correction. It is possible to construct the positive-power second lens group and the negative-power third lens group, both of them using glass materials whose Abbe numbers are substantially the same, to prevent chromatic aberration. Moreover, the negative power lens system comes last, and the optical path length can be shortened.

Since the third lens group that greatly contributes to the projection area can be constructed of a molded lens, it is possible to form a projection shape into a circle, the area of the module is small after dicing.

Moreover, in this case, it is possible to adjust focus with normal equipment by placement in a screw lens barrel, and it is possible to manufacture in a normal low-cost manufacturing process.

If the third lens group is assembled later, it is possible to bury the first lens groups closely in a wafer and increase the yield. Consequently, it is possible to reduce the cost as a whole.

There are advantages that the brightness is higher than that of the three-group configuration, and the depth of field is deeper than that of the four-group configuration.

In the case of having an equivalent Fno, the depth of field is equal to or more than that of the three-group/three-element and the total optical length can be shortened.

Consequently, it is possible to make a lens element that is small, bright and excellent in image forming characteristics, and has a deep depth of field at low cost. Especially, since the lens element is optimal to a fixed-focus optical system, and has a deep depth of field without an actuator, it is optimal also to products that are required to be highly reliable, such as mobile phones and vehicle-mounted, and is possible to be used in various fields.

Furthermore, it is useful to make the first lens on the incidence side a doublet lens in order to have high performance; accordingly, it is possible to construct an optical system whose chromatic aberration is further reduced, and it is possible to realize high brightness and resolution corresponding to the four-element configuration with a normal optical system.

The imaging lenses 100, 100A, 100B, 100C and 100D having the characteristics described above can be applied as a lens for a digital camera that uses an imaging element such as a CCD or CMOS sensor, especially a camera mounted on a small electronic device such as a mobile phone.

<7. Seventh Embodiment>

Figure 20:
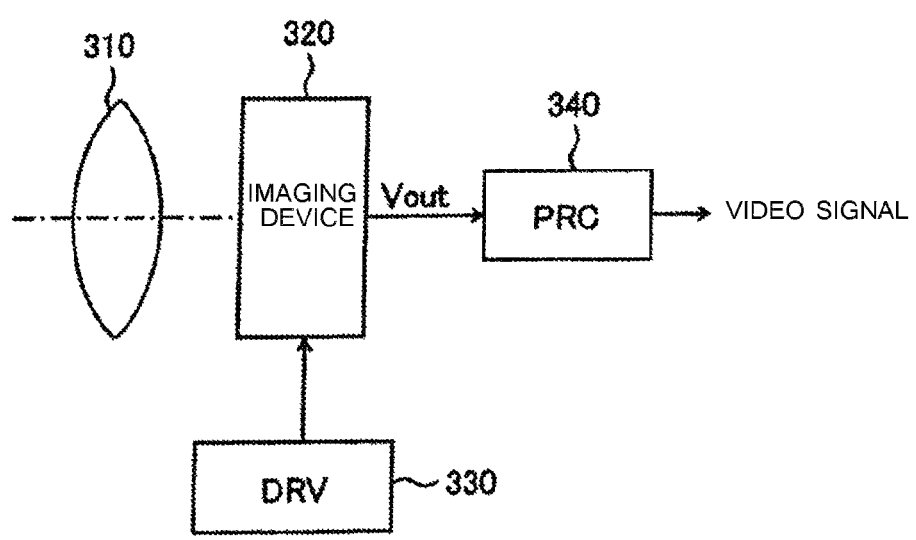
FIG. 20 is a block diagram illustrating a configuration example of an imaging apparatus in which the imaging lens according to the embodiment is adopted.

FIG. 20 is a block diagram illustrating a configuration example of an imaging apparatus in which an imaging lens including an optical unit according to the embodiment is adopted.

As shown in FIG. 20, an imaging apparatus 300 includes an optical system 310 according to the embodiment, to which the imaging lens 100, 100A, 100B, 100C or 100D is applied, and an imaging device 320 to which a CCD or CMOS image sensor (solid-state imaging device) can be applied.

The optical system 310 guides incident light to an imaging plane including a pixel area of the imaging device 320 to form an image of a subject.

The imaging apparatus 300 further includes a drive circuit (DRV) 330 that drives the imaging device 320 and a signal processing circuit (PRC) 340 that processes an output signal of the imaging device 320.

The drive circuit 330 includes a timing generator (not shown) that generates various timing signals including a start pulse and a clock pulse for driving a circuit in the imaging device 320, and drives the imaging device 320 with a predetermined timing signal.

Moreover, the signal processing circuit 340 performs predetermined signal processing on an output signal of the imaging device 320.

An image signal processed by the signal processing circuit 340 is recorded in a recording medium, for example, a memory.

The image information recorded in the recording medium is hard copied by a printer or the like. Moreover, the image signal processed by the signal processing circuit 340 is shown as a moving image on a monitor including a liquid crystal display.

As described above, in an imaging apparatus such as a digital still camera, the imaging lens 100, 100A, 100B, 100C or 100D is mounted as the optical system 310, and accordingly, it is possible to realize a low power and high precision camera.

Reference Signs List
100, 100A to 100D Imaging lens
110, 110A to 110D First lens group
120, 120A to 120D Second lens group
130, 130A to 130D Third lens group
300 Imaging apparatus
310 Optical system
320 Imaging device
330 Drive circuit (DRV)
340 Signal processing circuit (PRC)

The invention claimed is:

1. An optical unit comprising, arranged in order from an object side to an image plane side:
   a first lens group,
   a second lens group; and
   a third lens group,
   wherein,
      the first lens group includes, arranged in order from the object side to the image plane side, (a) a first lens element, (b) a first transparent body, and (c) a second lens element, and
      a focal length fg1 of the first lens group, a focal length fg2 of the second lens group, and a focal length fg3 of the third lens group satisfy the following conditional expressions:

$$0.5 \leq fg1/f \leq 1.5,$$

$$0.5 \leq fg2/f \leq 50, \text{ and}$$

$$-5 \leq fg3/f \leq -0.3,$$

where f is a total focal length.

2. The optical unit according to claim 1, wherein a bending factor qL2 of the second lens group satisfies the following conditional expressions:

$$-10 \leq qL2 \leq -0.4, \text{ and}$$

$$qL2 = (RL2S2 + RL2S1)/(RL2S2 - RL2S1),$$

where
      RL2S1 is a radius of curvature of an input side surface S1 of the second lens group, and
      RL2S2 is a radius of curvature of an outgoing side surface S2 of the second lens group.

3. The optical unit according to claim 1, wherein a paraxial quantity of the third lens group satisfies the following conditional expression and the surface shape includes a concave shape:

$$-3 \leq RL3S1/f \leq -0.2,$$

where
      RL3S1 is a radius of curvature of an incidence side surface S1 of the third lens group, and
      f is a focal length of the lens system.

4. The optical unit according to claim 1, wherein at least the third lens group is formed by being molded individually or in a wafer form and being subsequently diced to be assembled.

5. The optical unit according to 1, wherein each of the second and third lens groups includes only a single lens element.

6. The optical unit according to claim 1, wherein an angle of view satisfies the following conditional expression:

$$20 \le \omega \le 40$$

where ω is a half angle of view.

7. The optical unit according to 1, wherein an Abbe number vE1 of the first lens element and an Abbe number vE2 of the second lens element satisfy the following conditional expressions:

$$45 \le vE1 \le 90, \text{ and}$$

$$20 \le vE2 \le 60,$$

where
vE1 is the Abbe number of the first lens element, and
vE2 is the Abbe number of the second lens element.

8. The optical unit according to claim 1, wherein an F-number of the lens system satisfies the following conditional expression:

$$1.0 \le Fno \le 3.0.$$

9. The optical unit according to claim 1, wherein an optical length TT of the lens system satisfies the following conditional expression:

$$0.8 \le TT/f \le 1.5$$

where f is the total focal length.

10. The optical unit according to claim 1, wherein a back focus BF of the lens system satisfies the following conditional expression:

$$0.01 \le BF \le 0.6.$$

11. An optical unit comprising, arranged in order from an object side to an image plane side:
a first lens group;
a second lens group; and
a third lens group,
wherein
the first lens group includes, arranged in order from the object side to the image plane side, (a) a first lens element, (b) a first transparent body, and (c) a second lens element, the first lens element and the second lens element forming a doublet lens.

12. The optical unit according to claim 11, wherein the first lens element has a biconvex shape and the second lens element has a plano-concave shape, the first and second lens elements forming the doublet lens.

13. The optical unit according to claim 12, wherein an Abbe number of the first lens element is larger than an Abbe number of the second lens element.

14. An imaging apparatus comprising:
an imaging element; and
an optical unit for forming an image of a subject in the imaging element,
wherein,
(1) the optical unit includes, arranged in order from an object side to an image plane side, (a) a first lens group, (b) a second lens group, and (c) a third lens group, and
(2) the first lens group includes, arranged in order from an object side to an image plane side, (a) a first lens element, (b) a first transparent body, and a (c) second lens element, and
(3) a focal length fg1 of the first lens group, a focal length fg2 of the second lens group, and a focal length fg3 of the third lens group satisfy the following conditional expressions:

$$0.5 \le fg1/f \le 1.5,$$

$$0.5 \le fg2/f \le 50, \text{ and}$$

$$-5 \le fg3/f \le -0.3,$$

where f is a total focal length.

15. An imaging apparatus comprising:
an imaging element; and
an optical unit for forming an image of a subject in the imaging element,
wherein,
(1) the optical unit includes, arranged in order from an object side to an image plane side, (a) a first lens group, (b) a second lens group, and (c) a third lens group, and
(2) the first lens group includes, arranged in order from an object side to an image plane side, (a) a first lens element, (b) a first transparent body, and a (c) second lens element, the first lens element and the second lens element forming a doublet lens.

* * * * *